United States Patent
Nomura et al.

(10) Patent No.: US 6,657,794 B2
(45) Date of Patent: Dec. 2, 2003

(54) MOVABLE LENS HOOD MECHANISM OF A ZOOM LENS

(75) Inventors: Hiroshi Nomura, Saitama (JP); Nobuaki Aoki, Tokyo (JP); Yoshihiro Yamazaki, Saitama (JP); Satoru Nakamura, Tokyo (JP)

(73) Assignee: Pentax Corporation, Tokyo (JP)

( * ) Notice: Subject to any disclaimer, the term of this patent is extended or adjusted under 35 U.S.C. 154(b) by 161 days.

(21) Appl. No.: 09/772,872

(22) Filed: Jan. 31, 2001

(65) Prior Publication Data

US 2001/0019458 A1 Sep. 6, 2001

(30) Foreign Application Priority Data

Feb. 1, 2000 (JP) .......................................... 2000-024040

(51) Int. Cl.[7] .............................................. G02B 15/14
(52) U.S. Cl. ......................... 359/699; 359/703; 396/534
(58) Field of Search .................................. 359/699, 700, 359/701, 702, 703, 704, 819, 827; 396/534

(56) References Cited

U.S. PATENT DOCUMENTS 5,313,329 A    5/1994  Ueda et al. ................. 359/676
5,483,384 A  * 1/1996  Takizawa et al. ........... 359/827
5,745,803 A  * 4/1998  Ito ................................ 396/83

FOREIGN PATENT DOCUMENTS

EP          0 609 910     *  6/1989  .................. 396/534

* cited by examiner

Primary Examiner—Huy Mai
(74) Attorney, Agent, or Firm—Greenblum & Bernstein, P.L.C.

(57) ABSTRACT

A movable lens hood mechanism of a zoom lens includes a plurality of lens groups guided linearly in a direction of an optical axis to change a focal length of the zoom lens; a first cam barrel rotatably driven to move the plurality of lens groups in the optical axis direction; a movable hood barrel having a photographic aperture positioned in front of the frontmost lens group and guided linearly in the optical axis direction; and a feed mechanism which drives the movable hood barrel forward/rearward in the optical axis direction relative to the frontmost lens group by rotation of the first cam barrel so that a space between the photographic aperture of the movable lens hood and the frontmost lens group in the optical axis direction varies in accordance with a variation of a focal length of the zoom lens.

11 Claims, 18 Drawing Sheets

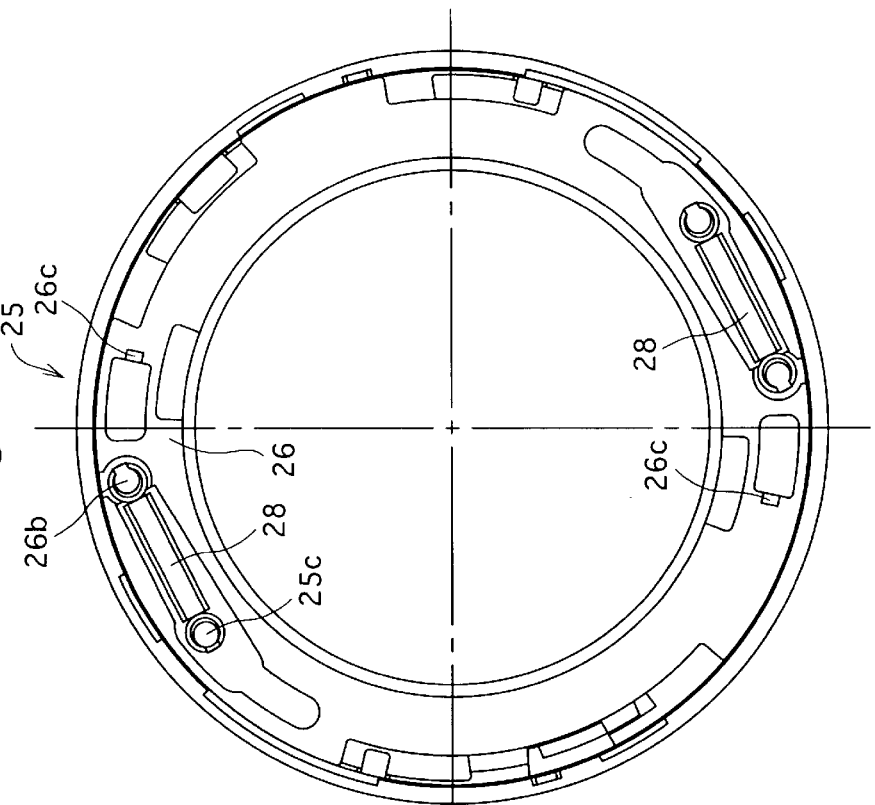
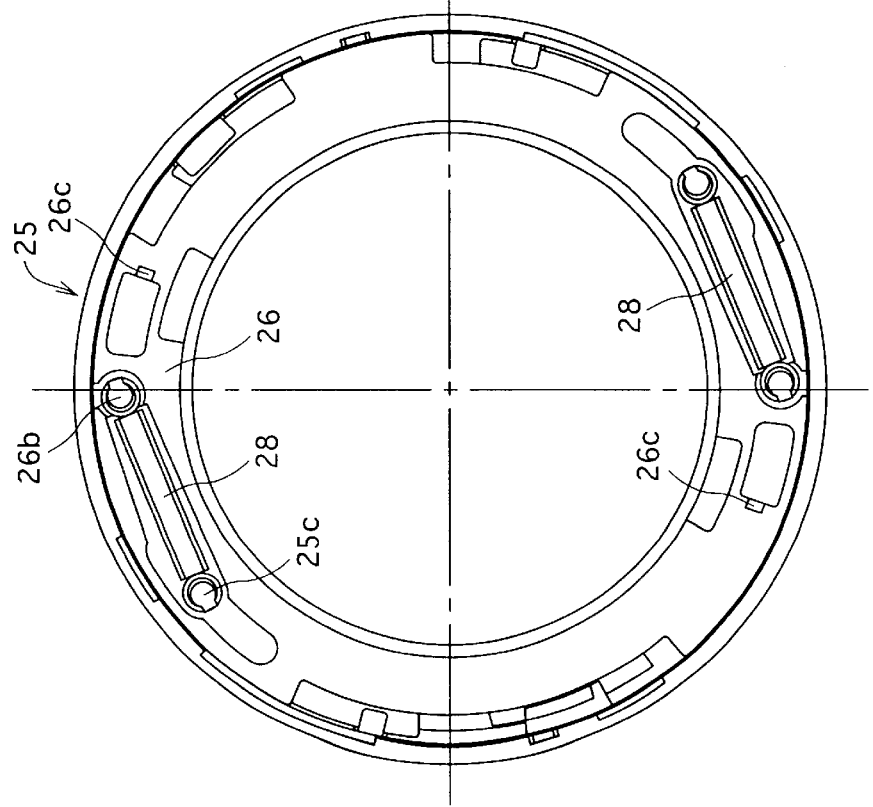

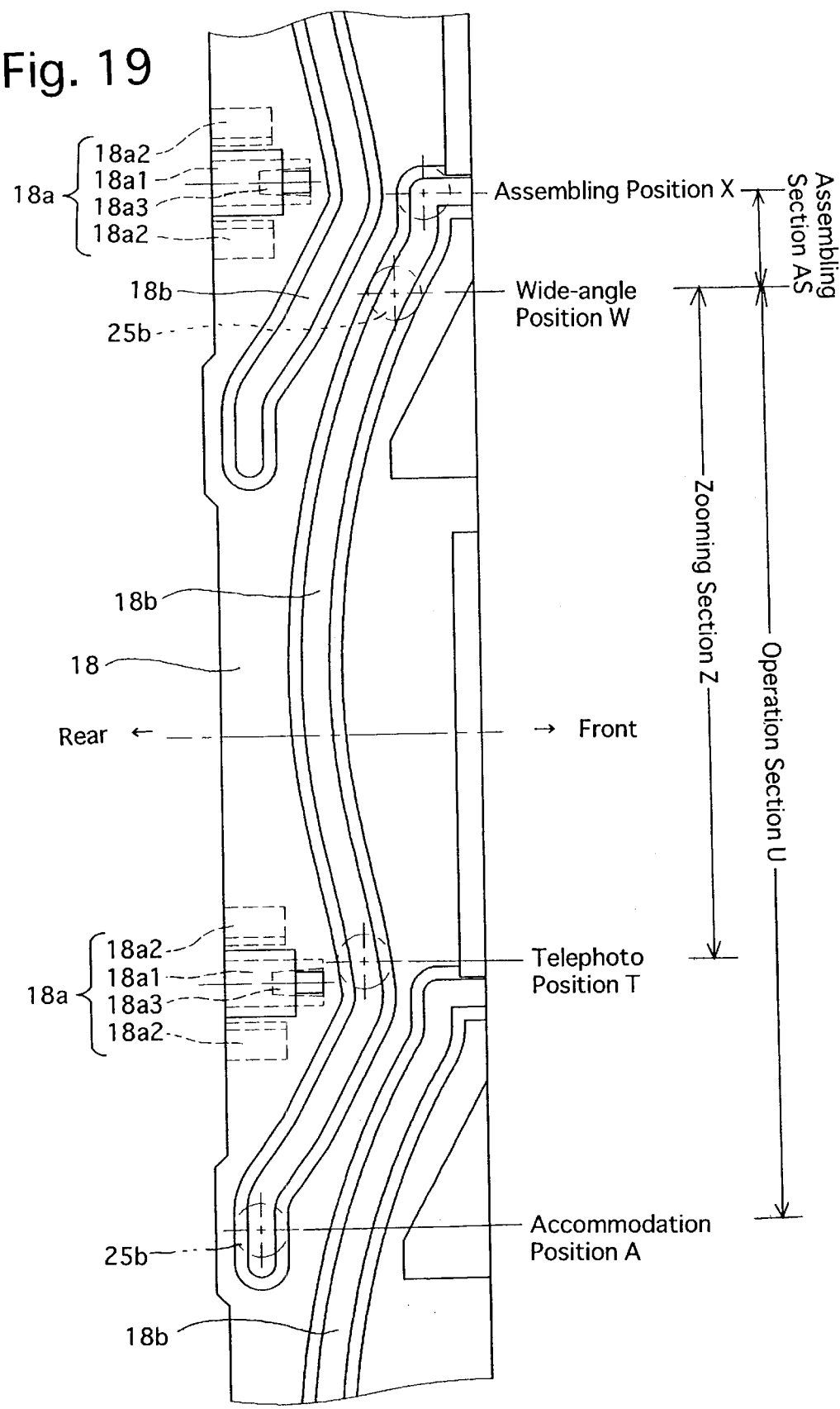

MOVABLE LENS HOOD MECHANISM OF A ZOOM LENS

BACKGROUND OF THE INVENTION

1. Field of the Invention

The present invention relates to a zoom lens, or a zoom lens barrel, and more specifically to a movable lens hood mechanism of the zoom lens.

2. Description of the Related Art

In a zoom lens whose angle of view varies in accordance with a variation of the focal length, unwanted light is preferably prevented from being incident on the lens surface in accordance with a variation of the angle of view. However, a zoom lens having a lens hood which can vary the maximum incident angle of light to the lens surface in accordance with a variation of the angle of view is not known in the art.

SUMMARY OF THE INVENTION

The present invention has been devised in view of the above-described problem, wherein an object of the present invention is to provide a zoom lens having a movable lens hood which can vary the maximum incident angle of light to the lens surface in accordance with a variation of the angle of view.

To achieve the object mentioned above, according to an aspect of the present invention, a movable lens hood mechanism of a zoom lens is provided, including a plurality of lens groups guided linearly in a direction of an optical axis to change a focal length of the zoom lens; a first cam barrel driven to rotate to move the plurality of lens groups in the optical axis direction; a movable hood barrel having a photographic aperture positioned in front of the frontmost lens group of the plurality of lens groups and guided linearly in the optical axis direction; and a feed mechanism which drives the movable hood barrel forward and rearward in the optical axis direction relative to the frontmost lens group by rotation of the first cam barrel so that a space between the photographic aperture of the movable lens hood and the frontmost lens group in the optical axis direction varies in accordance with a variation of a focal length of the zoom lens.

Preferably, the feed mechanism includes a second cam barrel for driving the moveable hood barrel forward and rearward in the optical axis direction, wherein the first cam barrel and second cam barrel are provided separately from each other, and the first cam barrel and second cam barrel rotate together about the optical axis.

Preferably, a barrier block is further provided fixed to a front end of the movable hood barrel to open and close the photographic aperture of the zoom lens.

In an embodiment, the feed mechanism includes a second cam barrel for driving the moveable hood barrel forward and rearward in the optical axis direction, wherein the first cam barrel and second cam barrel are provided separately from each other, and the first cam barrel and second cam barrel rotate together about the optical axis. The barrier block includes at least one barrier blade driven to open and close the photographic aperture, the movable lens hood mechanism further including a barrier drive ring driven to rotate by rotation of the second cam barrel to open and close the at least one barrier blade.

The above-described zoom lens can be incorporated in a digital camera.

In an embodiment, the feed mechanism includes a second cam barrel which is fitted on the first cam barrel, wherein the movable hood barrel is driven forward and rearward in the optical axis direction by rotation of the first cam barrel via the second cam barrel of the feed mechanism.

In an embodiment, the feed mechanism further includes a plurality of inward pins, fixed to the moveable hood barrel, which project radially inwards; and a corresponding plurality of guide grooves formed on an outer peripheral surface of the second cam barrel, the plurality of inward pins being respectively engaged in the corresponding plurality of guide grooves so that the moveable hood barrel moves in the optical axis direction by rotation of the second cam barrel.

According to another aspect of the present invention, a movable lens hood mechanism of a zoom lens is provided, including a movable lens hood guided along an optical axis; and a feed mechanism which drives the movable lens hood forward and rearward along the optical axis to vary a maximum incident angle of light to a front surface of a frontmost lens group of the zoom lens in accordance with a variation of the angle of view of the zoom lens.

Preferably, a barrier block is provided fixed to the front end of the movable lens hood and having at least one barrier blade for opening and closing a photographic aperture of the zoom lens.

In an embodiment, the movable lens hood mechanism further includes a rotation transfer recess formed on an outer peripheral surface of the second cam barrel, and a driven lever provided on the movable hood barrel. When a relative distance in the optical axis direction between the second cam barrel and the movable hood barrel becomes less than a predetermined distance, the driven lever associates with the rotation transfer recess so that the rotation of the second cam barrel is transmitted to the driven lever.

According to another aspect of the present invention, a zoom lens is provided, including a plurality of lens groups which are moved with respect to each other to change a focal length of the zoom lens; a focusing lens group positioned behind the plurality of lens groups and driven in a direction of the optical axis to bring an object to be photographed into focus; a first cam barrel having at least one cam groove on an inner peripheral surface of the first cam barrel, at least one of the plurality of lens groups being moved in the optical axis direction by rotation of the first cam barrel in accordance with a profile of the at least one cam groove; a second cam barrel which is fitted on a front part of an outer peripheral surface of the first cam barrel to be rotatable about the optical axis together with the first cam barrel; a movable hood barrel positioned around the second cam barrel and guided in the optical axis direction; at least one inward pin fixed to the movable hood barrel to project radially inwards; and at least one guide groove formed on an outer peripheral surface of the second cam barrel, the at least one inward pin being respectively engaged in the at least one guide groove so that the movable hood barrel is driven forward and rearward in the optical axis direction relative to a frontmost lens group of the plurality of lens groups by rotation of the second cam barrel.

The present disclosure relates to subject matter contained in Japanese Patent Application No.2000-24040 (filed on Feb. 1, 2000) which is expressly incorporated herein by reference in its entirety.

BRIEF DESCRIPTION OF THE DRAWINGS

The present invention will be described below in detail with reference to the accompanying drawings in which:

FIG. 17 is a front view of the moveable external barrel that is supported by the moveable external barrel to be freely rotatable about the optical axis, in a state where the barrier drive ring is rotated to one rotational limit thereof to thereby fully close the two pairs of barrier blades;

FIG. 18 is a front view of the moveable external barrel shown in FIG. 17, in a state where the barrier drive ring is rotated to the other rotational limit thereof to thereby fully open the two pairs of barrier blades; and FIG. 19 is a developed view of the second cam barrel, showing an embodiment of the contour of each guide groove formed on the second cam barrel.

DESCRIPTION OF THE PREFERRED EMBODIMENT

Figure 1:
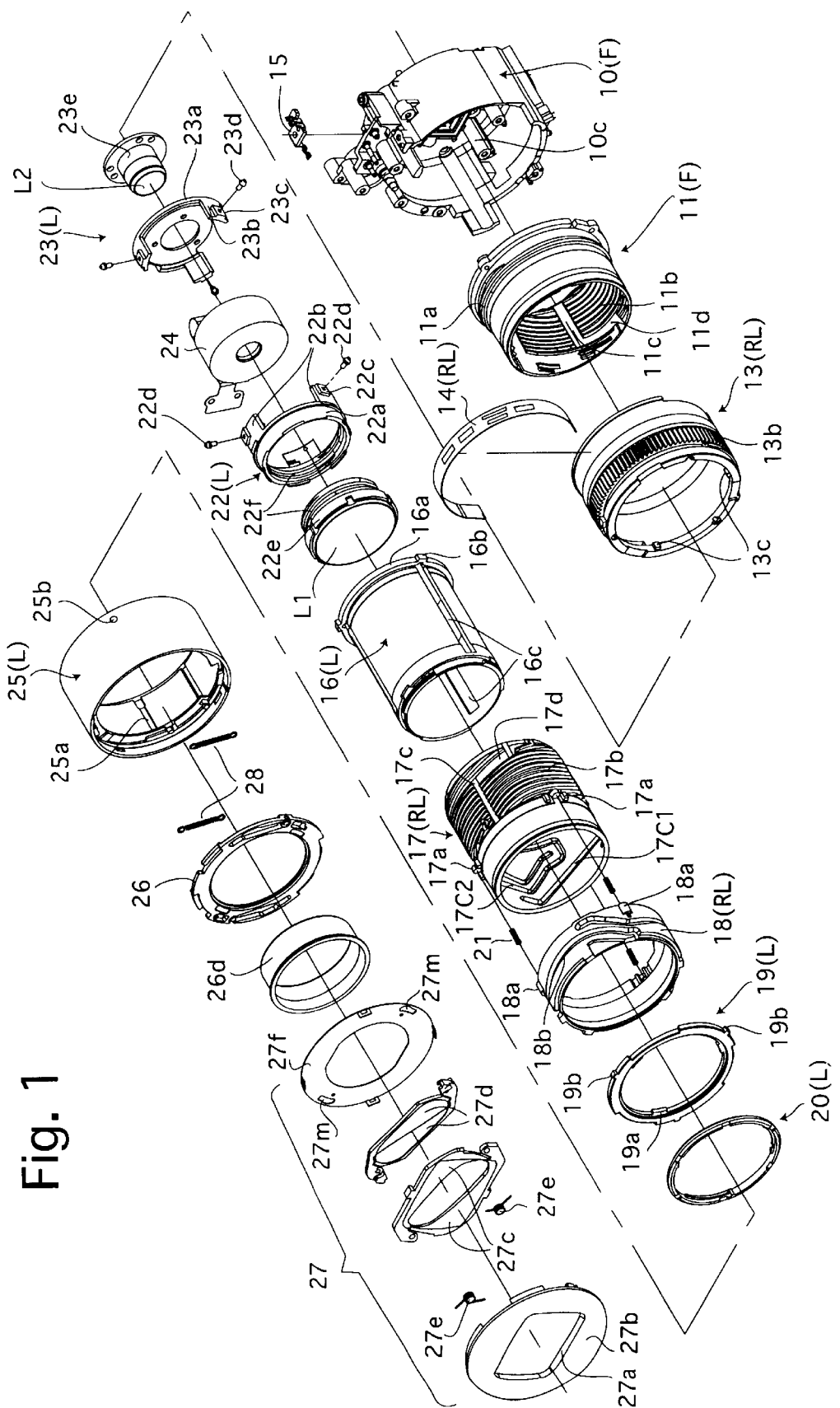
FIG. 1 is an exploded perspective view of an embodiment of a zoom lens according to the present invention, showing the overall structure thereof.

A preferred embodiment of a zoom lens (zoom lens barrel) according to the present invention that is incorporated in a digital camera will be hereinafter discussed. Firstly, the overall structure of the zoom lens will be discussed with reference mainly to FIGS. 1 and 2. In the drawings and the following descriptions, symbols "(F)", "(L)" and "(RL)" which are each appended as a suffix to the reference numeral of some elements of the zoom lens barrel indicate that the element is stationary, the element is movable linearly along an optical axis O of the zoom lens without rotating about the optical axis O, and the element is movable along the optical axis O while rotating about the optical axis O, respectively.

Figure 2:
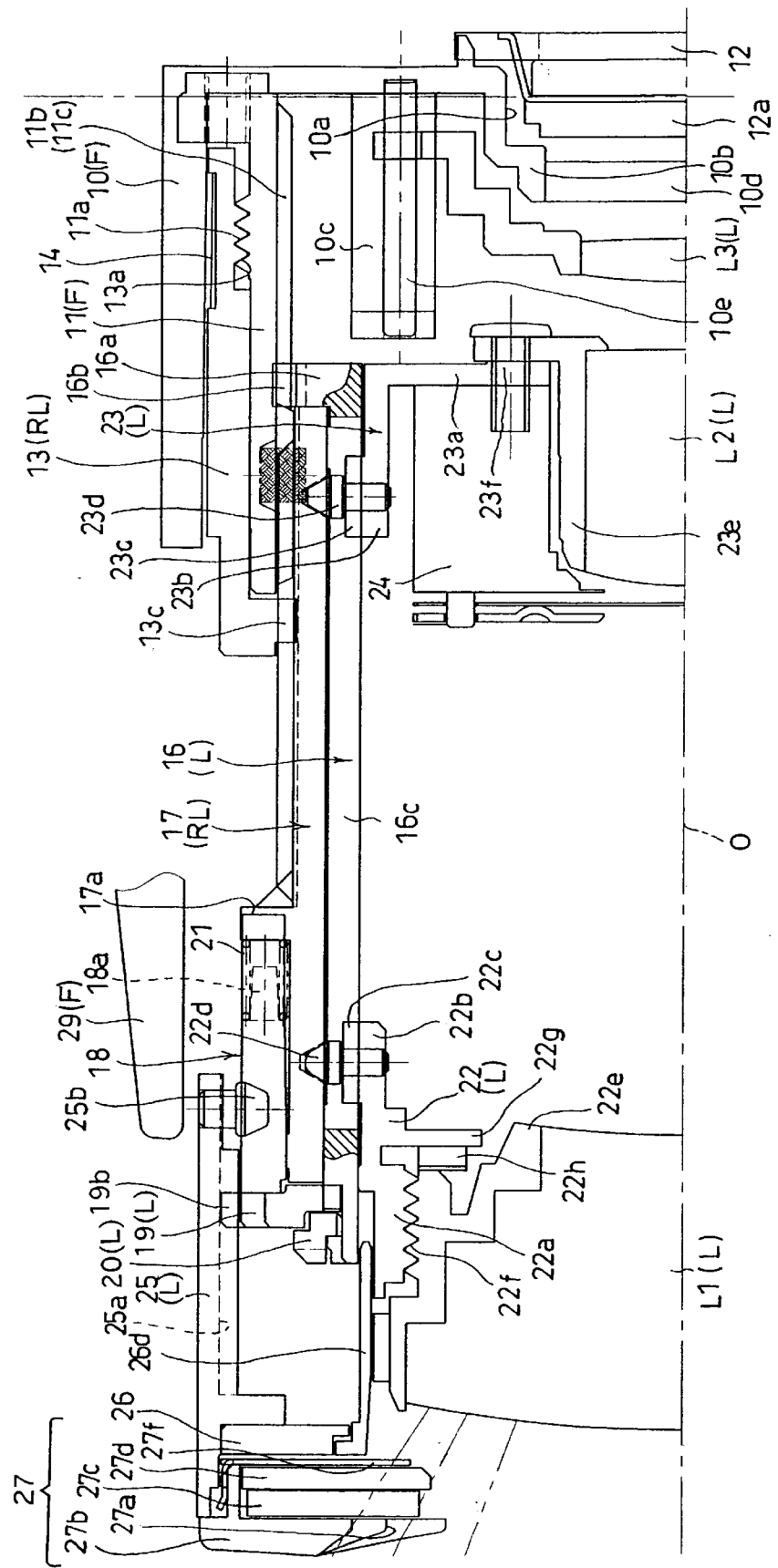
FIG. 2 is an axial cross sectional view of the zoom lens shown in FIG. 1, showing the zoom lens above the optical axis thereof.

The photographic optical system of the zoom lens includes three lens groups; namely, a first lens group (front lens group) L1 (L), a second lens group (middle lens group) L2 (L) and a third lens group (rear lens group) L3 (L), in this order from the object side (the left side as viewed in FIG. 2). The zoom lens performs zooming by moving the first and second lens groups L1 and L2 along the optical axis O relative to the sensitive surface of a stationary CCD 12a (see FIG. 1) and at the same time changing the space between the first and second lens groups L1 and L2 in a predetermined manner. The zoom lens performs a focusing operation by moving the third lens group L3 along the optical axis O to bring an object into focus. The third lens group L3 functions as a focusing lens group which is driven along the optical axis O independently of the axial position of each of the first and second lens groups L1 and L2. Thus, the zoom lens is an internal-focusing type zoom lens having a lens construction which allows the focus to be altered by moving the rearmost lens group provided as a focusing lens group internally within the lens barrel.

The zoom lens is provided with a housing 10 (F) which is fixed to a camera body of a digital camera (not shown). The housing 10 can be integral with the camera body to be provided as an element thereof. The zoom lens is provided in the housing 10 with a stationary barrel 11 (F) that is fixed to the housing 10. The stationary barrel 11 is provided on an outer peripheral surface thereof with a fine male thread 11a. The stationary barrel 11 is provided on an inner peripheral surface thereof with a female helicoid (female helicoidal thread) 11b and three linear guide grooves 11c (only one is shown in FIG. 1) extending parallel to the optical axis O, i.e., extending in the optical axis direction. The three linear guide grooves 11c are formed to cut across the female helicoid 11b. The three linear guide grooves 11c are formed at 120° intervals (i.e., at an equi-angular distance) about the axis of the stationary barrel 11.

As shown in FIG. 2, the housing 10 is provided with a CCD insertion opening 10a, a filter fixing portion 10b and a focusing lens group guide portion 10c. The CCD 12a which is fixed to a substrate 12 is positioned in the CCD insertion opening 10a. A filter 10d such as-a low-pass filter is fixed to the filter fixing portion 10b. The third lens group L3 is guided by the focusing lens group guide portion 10c to be movable in the optical axis direction. The axial position of the third lens group L3 on the optical axis O is determined by the direction of rotation of a feed screw 10e and the angle of rotation (amount of rotation) thereof. The feed screw 10e extends parallel to the optical axis O from the camera body in the focusing lens group guide portion 10c. The feed screw 10e is driven by a pulse motor (not shown) provided in the camera body. The angle of rotation of the feed screw 10e is controlled via an encoder (not shown) of the pulse motor.

The zoom lens is provided on the stationary barrel 11 with a rotational barrel 13 (RL). The rotational barrel 13 is provided on an inner peripheral surface thereof with a fine female thread 13a which meshes with the fine male thread 11a of the stationary barrel 11. The rotational barrel 13 is provided on an outer peripheral surface thereof with a circumferential gear 13b (see FIG. 1). The rotational barrel 13 is driven to rotate about the optical axis O by a drive pinion (not shown) which meshes with the circumferential gear 13b. When the rotational barrel 13 is driven to rotate about the optical axis O, the rotational barrel 13 moves in the optical axis direction while rotating about the optical axis O in accordance with the engagement of the fine female thread 13a with the fine male thread 11a. The rotational barrel 13 is provided at the front end of an inner peripheral surface thereof with three inward projections 13c at 120° intervals about the axis of the rotational barrel 13. As shown in FIG. 1, a flexible coding plate 14 (RL) is fixed on an outer peripheral surface of the rotational barrel 13 along a circumference thereof, while a brush 15 (F) that is in contact with the coding plate 14 is fixed to the housing 10. The brush 15 remains in sliding contact with the coding plate 14 regardless of a movement of the coding plate 14 relative to the brush 15 when the coding plate 14 moves in the optical axis direction in accordance with the engagement of the fine female thread 13a with the fine male thread 11a, so as to sense the rotational position of the rotational barrel 13 as digital and/or analogue information. The fine female thread 13a, which is provided on the rotational barrel 13, is provided as a device for supporting the rotational barrel 13 on the stationary barrel 11 so that the rotational barrel 13 can rotate freely about the optical axis O on the stationary barrel 11. However, alternatively, the rotational barrel 13 can be supported on the stationary barrel 11 so as to be able to rotate freely about the optical axis O without moving in the optical axis direction relative to the stationary barrel 11.

The zoom lens is further provided with a linear guide barrel 16 (L), a first cam barrel 17 (RL) and a second cam barrel 18 (RL). The first cam barrel 17 is fitted on the linear guide barrel 16 to be rotatable about the optical axis O relative to the linear guide barrel 16 and to be immovable in the optical axis direction relative to the linear guide barrel 16. The second cam barrel 18 is fitted on the front end of the first cam barrel 17 to be rotatable together with the first cam barrel 17 about the optical axis O and also to be movable in the optical axis direction relative to the first cam barrel 17. The linear guide barrel 16, the first cam barrel 17 and the second cam barrel 18 are assembled in advance as a unit, and the rear of this barrel unit is positioned in the stationary barrel 11. The linear guide barrel 16 is provided at the rear end thereof with an outer flange 16a. A linear guide ring (flange ring) 19 (L) is fixed to the front end of the linear guide barrel 16 via a retainer ring 20 (L). The first cam barrel 17 is held between the outer flange 16a and the linear guide ring 19, and is rotatable about the optical axis O relative to the linear guide barrel 16 and also movable together with the linear guide barrel 16 in the optical axis direction.

The second cam ring 18, which is fitted on the front end of the first cam barrel 17, is provided at the rear end thereof with three linear guide portions 18a (only two are shown in FIG. 1) at 120° intervals about the axis of the second cam ring 18. Each of the three linear guide portions 18a is provided with a spring holding groove 18a1, and a pair of guide grooves 18a2 positioned on the opposite sides of the spring holding groove 18a1 in a circumferential direction of the second cam ring 18 (see FIGS. 8 and 9). Each of the three linear guide portions 18a is further provided, in each spring holding groove 18a1 at the front end (the left end as viewed in FIG. 8 or 9) of each spring holding groove 18a1, with an engaging projection 18a3. All of the spring holding grooves 18a1 and the pairs of guide grooves 18a2 extend parallel to the optical axis O. The first cam barrel 17 is provided on an outer peripheral surface thereof with three stopper portions 17a (only two are shown in FIG. 1) at 120° intervals about the axis of the first cam barrel 17. Each of the three stopper portions 17a is provided with a stopper projection 17a1, and a pair of guide projections 17a2 positioned on the opposite sides of the stopper projection 17a1 in a circumferential direction of the first cam barrel 17 (see FIG. 4). Each pair of guide projections 17a2 of the first cam barrel 17 are respectively fitted in the corresponding pair of guide grooves 18a2 of the second cam ring 18 to be slidable in the optical axis direction relative to the second cam ring 18, with a compression spring 21 being held between each engaging projection 18a3 and the corresponding stopper projection 17a1. Due to this structure, the second cam barrel 18 can slide on the first cam barrel 17 in the optical axis direction without rotating about the optical axis O relative to the first cam barrel 17. The compression springs 21 constantly bias the second cam barrel 18 toward the front of the zoom lens, so that the front end of the second cam barrel 18 is usually in press-contact with the linear guide ring 19. The second cam barrel 18 can move rearward, toward the rear of the zoom lens, against the spring force of the compression springs 21 by an amount of movement corresponding to a predetermined clearance in the optical axis direction between the guide grooves 18a2 and the guide projections 17a2. The second cam barrel 18 can also be slightly inclined with respect to the first cam barrel 17 (i.e., with respect to the optical axis O) by an amount of inclination corresponding to a predetermined clearance in a radial direction between the inner peripheral surface of the second cam barrel 18 and the corresponding outer peripheral surface of the first cam barrel 17.

The first cam barrel 17 is provided on an outer peripheral surface thereof with a male helicoid (male helicoidal thread) 17b that is engaged with the female helicoid 11b of the stationary barrel 11, and three rotation transmission grooves 17c that extend parallel to the optical axis O. The three rotation transmission grooves 17c are formed so as to cut across the male helicoid 17b. The three rotation transmission grooves 17c are formed at 120° intervals about the axis of the first cam barrel 17. The three inward projections 13c of the rotational barrel 13 are respectively engaged with the three rotation transmission grooves 17c to be relatively slidable to each other. The linear guide barrel 16 is provided on the outer flange 16a thereof with three linear guide projections 16b at 120° intervals about the axis of the linear guide barrel 16. Each linear guide projection 16b extends radially outwards to be engaged with the corresponding linear guide groove 11c of the stationary barrel 11. The linear guide barrel 16 is further provided with three linear guide slots 16c at 120° intervals about the axis of the linear guide barrel 16 so that the circumferential positions of the three linear guide slots 16c coincide with those of the three linear guide projections 16b. Each of the three linear guide slots 16c penetrates the linear guide barrel 16 radially and extends parallel to the optical axis O.

Figure 4:
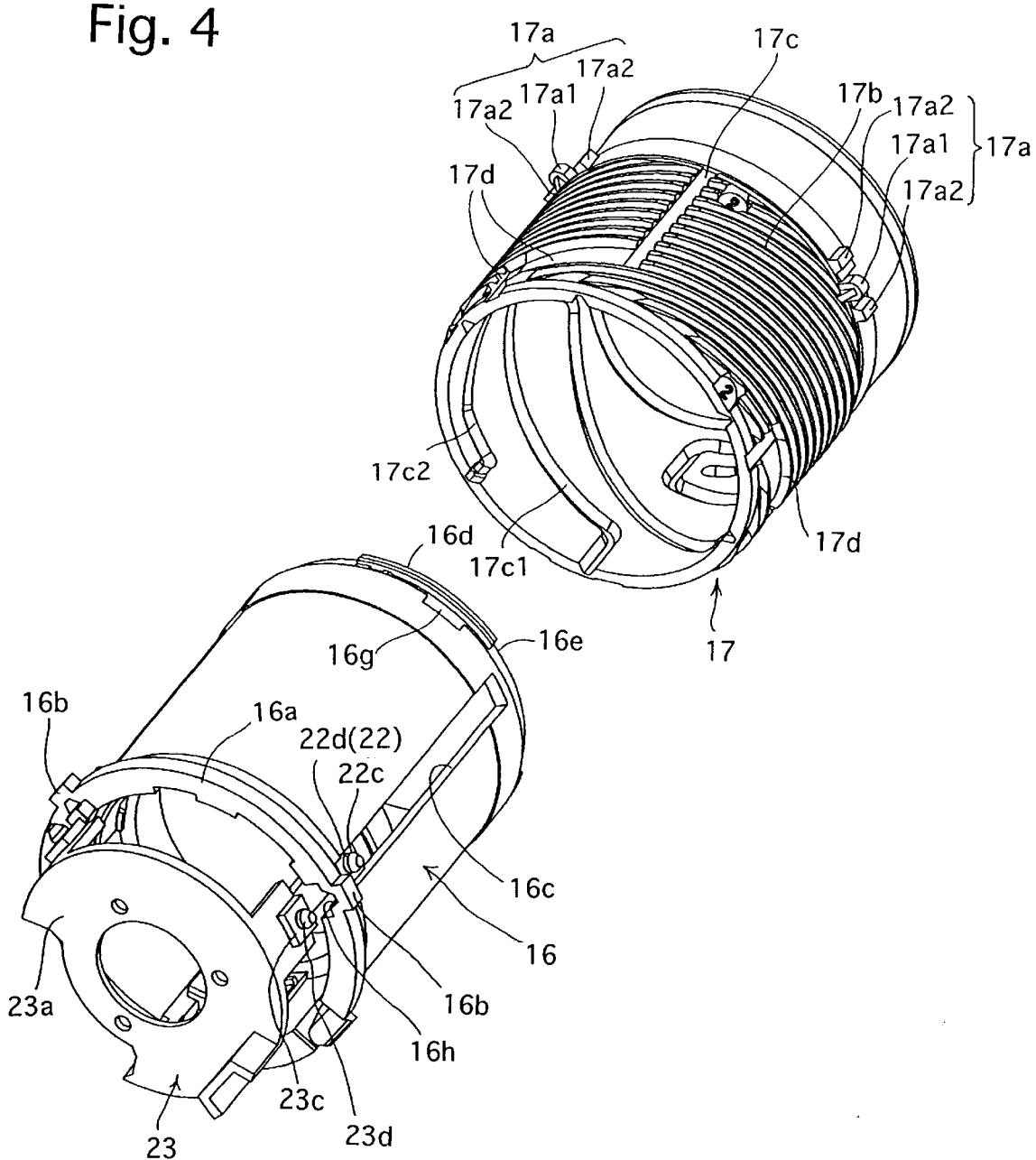
FIG. 4 is an exploded perspective view of the first cam barrel shown in FIG. 3, a linear guide barrel, a first lens frame and a second lens frame.
Figure 5:
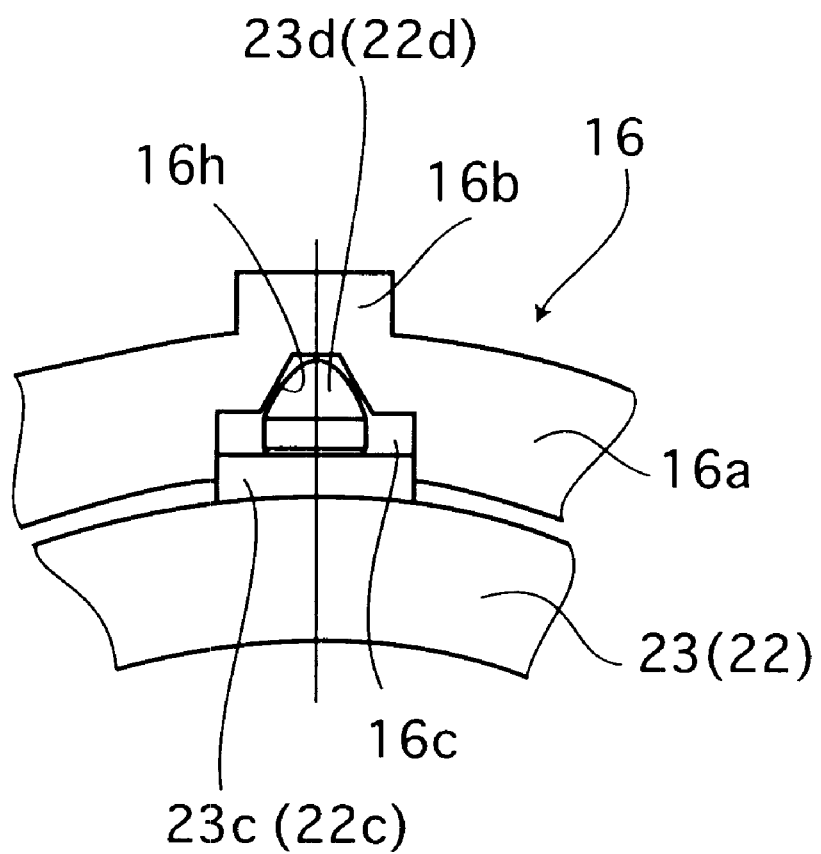
FIG. 5 is a fragmentary rear view of the linear guide barrel and the first lens frame, showing the periphery of an insertion groove of the linear guide barrel.
Figure 6:
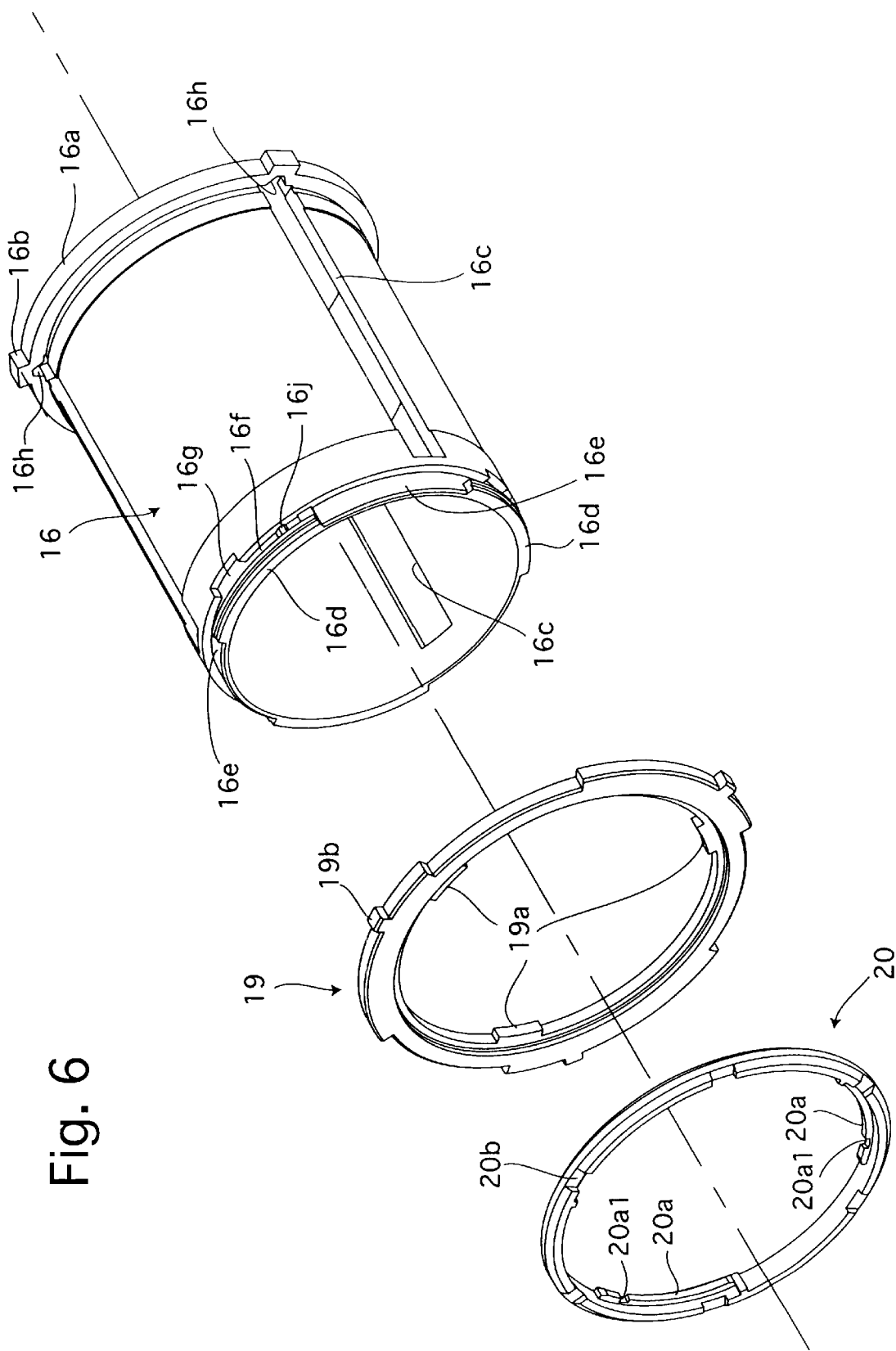
FIG. 6 is an exploded perspective view of the linear guide barrel, a linear guide ring and a retainer ring.

As can be seen in FIGS. 4, 5 and 6, each of the three linear guide slots 16c opens at the rear end of the linear guide barrel 16, and the rear end of each linear guide slot 16c is covered by the corresponding part of the outer flange 16a and the corresponding linear guide projection 16b at the radially outer side of the linear guide barrel 16. The outer flange 16a is provided with three insertion grooves 16h which respectively extend along a portion of each three linear guide slots 16c from the front end of the outer flange 16a to each respective rear end of the three linear guide slots 16c (i.e., the rear end of the outer flange 16a), so that a follower pin 22d (cam follower) and a follower pin (cam follower) 23d can be inserted into each linear guide slot 16c from the corresponding insertion groove 16h.

When the barrel unit which includes the linear guide barrel 16, the first cam barrel 17 and the second cam barrel 18 is coupled to the stationary barrel 11 and the rotational barrel 13, each of the three linear guide projections 16b of the linear guide barrel 16 is inserted into the corresponding linear guide groove 11c of the stationary barrel 11 via a corresponding introducing groove lid formed on an inner peripheral surface of the stationary barrel 11, and each of the three inward projections 13c of the rotational barrel 13 is inserted into the corresponding rotation transmission groove 17c of the first cam barrel 17 via a corresponding introducing groove 17d formed on an outer peripheral surface of the first cam barrel 17. After each linear guide projection 16b and each inward projection 13c are inserted into the corresponding linear guide groove 11c and the corresponding rotation transmission groove 17c, respectively, the female helicoid 11b of the stationary barrel 11 and the male helicoid 17b of the first cam barrel 17 mesh with each other.

FIG. 2 shows a state where the barrel unit, which includes the linear guide barrel 16, the first cam barrel 17 and the second cam barrel 18, has been coupled to the stationary barrel 11 and the rotational barrel 13. In this state, rotating the rotational barrel 13 about the optical axis O via the gear 13b causes the rotational barrel 13 to move in the optical axis direction while rotating about the optical axis O due to the engagement of the fine female thread 13a with the fine male thread 11a. At the same time, the rotation of the rotational barrel 13 is transmitted to the first cam barrel 17 and the second cam barrel 18, which is fitted on the first cam barrel 17, due to the engagement of the inward projections 13c with the rotation transmission grooves 17c, so that the first cam barrel 17 and the second cam barrel 18 rotate about the optical axis O. At this time, the first cam barrel 17 and the second cam barrel 18 also move in the optical axis direction O due to the engagement of the male helicoid 17b with the female helicoid 11b. Furthermore, the linear guide barrel 16 moves in the optical axis direction without rotating about the optical axis O due to the engagement of the linear guide projections 16b with the linear guide grooves 11c, and at the same time the first and second cam barrels 17 and 18, which rotate about the optical axis O relative to the linear guide barrel 16, move together with the linear guide barrel 16 in the optical axis direction.

Figure 3:
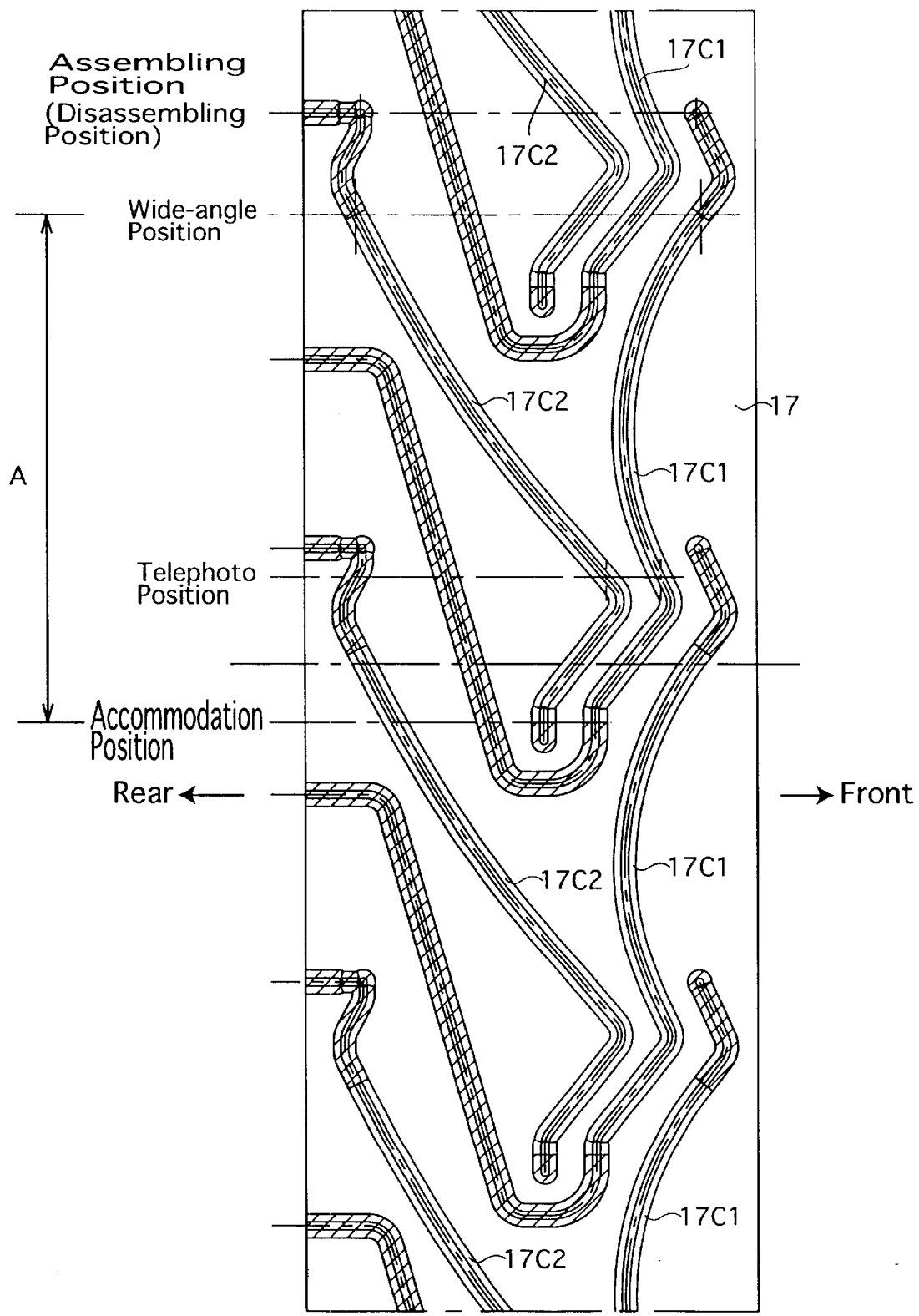
FIG. 3 is a developed view of the inner peripheral surface of a first cam barrel, showing the contours of first and second cam grooves formed on the inner peripheral surface of the first cam barrel.

The first cam barrel 17 is provided on an inner peripheral surface thereof with three first cam grooves 17C1 for driving the first lens group L1, and three second cam grooves 17C2 for driving the second lens group L2. FIG. 3 is a developed view of the inner peripheral surface of the first cam barrel 17, showing the contours of the first and second cam grooves 17C1 and 17C2. The three first cam grooves 17C1 are formed on the inner peripheral surface of the first cam barrel 17 at 120° intervals about the axis of the first cam barrel 17. Likewise, the three second cam grooves 17C2 are formed on the inner peripheral surface of the first cam barrel 17 at 120° intervals about the axis of the first cam barrel 17. Each of the first and second cam grooves 17C1 and 17C2 has three predetermined positions: an accommodation position, a telephoto position and a wide-angle, in this order along the direction of rotation of the first cam barrel 17 (the vertical direction as viewed in FIG. 3). The telephoto position shown in FIG. 3 of each cam groove 17C1 and 17C2 determines the telephoto extremity of the corresponding lens groups L1 and L2, respectively; the wide-angle position of each cam groove 17C1 and 17C2 determines the wide-angle extremity of the corresponding lens groups L1 and L2, respectively; and the accommodation position of each cam groove 17C1 and 17C2 determines the position of the corresponding lens groups L1 and L2, respectively, when the power of the digital camera is turned OFF. The angle of rotation from the accommodation position to the wide-angle extremity position is shown by "A" in FIG. 3.

The zoom lens is provided with a first lens frame 22 (L) and a second lens frame 23 (L) which support the first lens group L1 and the second lens group L2, respectively. The first lens frame 22 is guided by the first cam grooves 17C1 and the linear guide slots 16c to be movable in the optical axis direction without rotating about the optical axis O. Likewise, the second lens frame 23 is guided by the second cam grooves 17C2 and the linear guide slots 16c to be movable in the optical axis direction without rotating about the optical axis O. The first lens frame 22 is provided with three resilient extending pieces 22b which extend rearward from a cylindrical portion 22a of the first lens frame 22. The three resilient extending pieces 22b are formed on the first lens frame 22 at 120° intervals about the axis of the first lens frame 22. Each resilient extending piece 22b is provided on a radially outer surface thereof with a square projection 22c which extends radially outwards to be fitted in the corresponding linear guide slot 16c in a slidable manner in the optical axis direction. Each resilient extending piece 22b is further provided on top of each square projection 22c with the follower pin 22d, which is fixed to the resilient extending piece 22b to extend radially outwards. Each square projection 22c is formed so that the opposite faces thereof, which are respectively in sliding contact with the side faces of the corresponding linear guide slot 16c, extend parallel to each other. The zoom lens is provided with a first lens holder 22e which encloses the first lens group L1 to hold the same. The first lens holder 22e is fixed to the cylindrical portion 22a of the first lens frame 22 via male and female threads 22f which are formed on an outer peripheral surface of the first lens holder 22e and an inner peripheral surface of the cylindrical portion 22a, respectively. The position of the first lens group L1 relative to the first lens frame 22 in the optical axis direction can be adjusted by varying the amount of engagement between the male and female threads 22f. A wave washer 22h is held between the holder 22e and an inner flange 22g of the first lens frame 22 to remove the play between the first lens holder 22e (or the first lens group L1) and the first lens frame 22 (see FIG. 2).

The second lens frame 23 is provided with three resilient extending pieces 23b which extend forward from an annular plate portion 23a of the second lens frame 23. The three resilient extending pieces 23b are formed on the second lens frame 23 at 120° intervals about the axis of the second lens frame 23. Each resilient extending piece 23b is provided on a radially outer surface thereof with a square projection 23c which extends radially outwards to be fitted in the corresponding linear guide slot 16c in a slidable manner in the optical axis direction. Each resilient extending piece 23b is further provided on top of each square projection 23c with the aforementioned follower pin 23d, which is fixed to the resilient extending piece 23b to extend radially outwards. The square projections 23c and the follower pins 23d of the second lens frame 23 are identical to the square projections 22c and the follower pins 22d of the first lens frame 22 except that the resilient extending pieces 23b of the second lens frame 23 extend in the direction opposite to the resilient extending pieces 22b of the first lens frame 22 in the optical axis direction. The zoom lens is provided with a second lens holder 23e which encloses the second lens group L2 to hold the same. The second lens holder 23e is fixed to the annular plate portion 23a of the second lens frame 23 via set screws 23f. A shutter block 24 is provided around the second lens group L2. The shutter block 24 is fixed to the annular plate portion 23a of the second lens frame 23 via the set screws 23f that are screwed into the rear of the shutter block 24. The shutter block 24 functions to interrupt light bundles which are incident on the CCD 12a at a shutter release operation.

Each of the first and second lens frames 22 and 23 is guided linearly in the optical axis direction without rotating about the optical axis O by the engagement of each of the three square projections 22c and corresponding each of the three square projections 23c with each common corresponding linear guide slot of the three linear guide slots 16c. Each follower pin 22d penetrates the corresponding linear guide slot 16c of the linear guide barrel 16 to be engaged with the corresponding first cam groove 17C1 of the first cam barrel 17, which is fitted on the linear guide barrel 16 to be rotatable about the optical axis relative to linear guide barrel 16. Likewise, each follower pin 23d penetrates the corresponding linear guide slot 16c of the linear guide barrel 16 to be engaged with the corresponding second cam groove 17C2 of the first cam barrel 17. When the first and second lens frames 22 and 23 are placed in the linear guide barrel 16 and the first cam barrel 17, firstly each of the three square projections 22c and corresponding one of the three square projections 23c are inserted into a corresponding linear guide slot of the three linear guide slots 16c from the rear end face of the linear guide barrel 16. At the same time, each of the three follower pins 22d and corresponding one of the three follower pins 23d are inserted into corresponding one of the three insertion grooves 16h to be fitted in the corresponding first and second cam grooves 17C1 and 17C2, respectively. It should be noted that the hatched areas of the first and second cam grooves 17C1 and 17C2 in FIG. 3 are used solely for the purpose of inserting each follower pin 22d or 23d into the corresponding cam groove 17C1 or 17C2 during assembly, and thus are not used when the zoom lens is in operation.

According to the above described guide structure, rotating the rotational barrel 13 about the optical axis O causes the barrel unit which includes the linear guide barrel 16, the first cam barrel 17 and the second cam barrel 18 to move in the optical axis direction. During this movement of the barrel unit, the first and second cam barrels 17 and 18 rotate together about the optical axis O, but the linear guide barrel 16 does not rotate about the optical axis O. As a result, the first lens frame 22 (the first lens group L1) and the second lens frame 23 (the second lens group L2) linearly move in the optical axis direction while changing the space therebetween in accordance with the contours of the first and second cam grooves 17C1 and 17C2 to thereby carry out a zooming operation.

Figure 7:
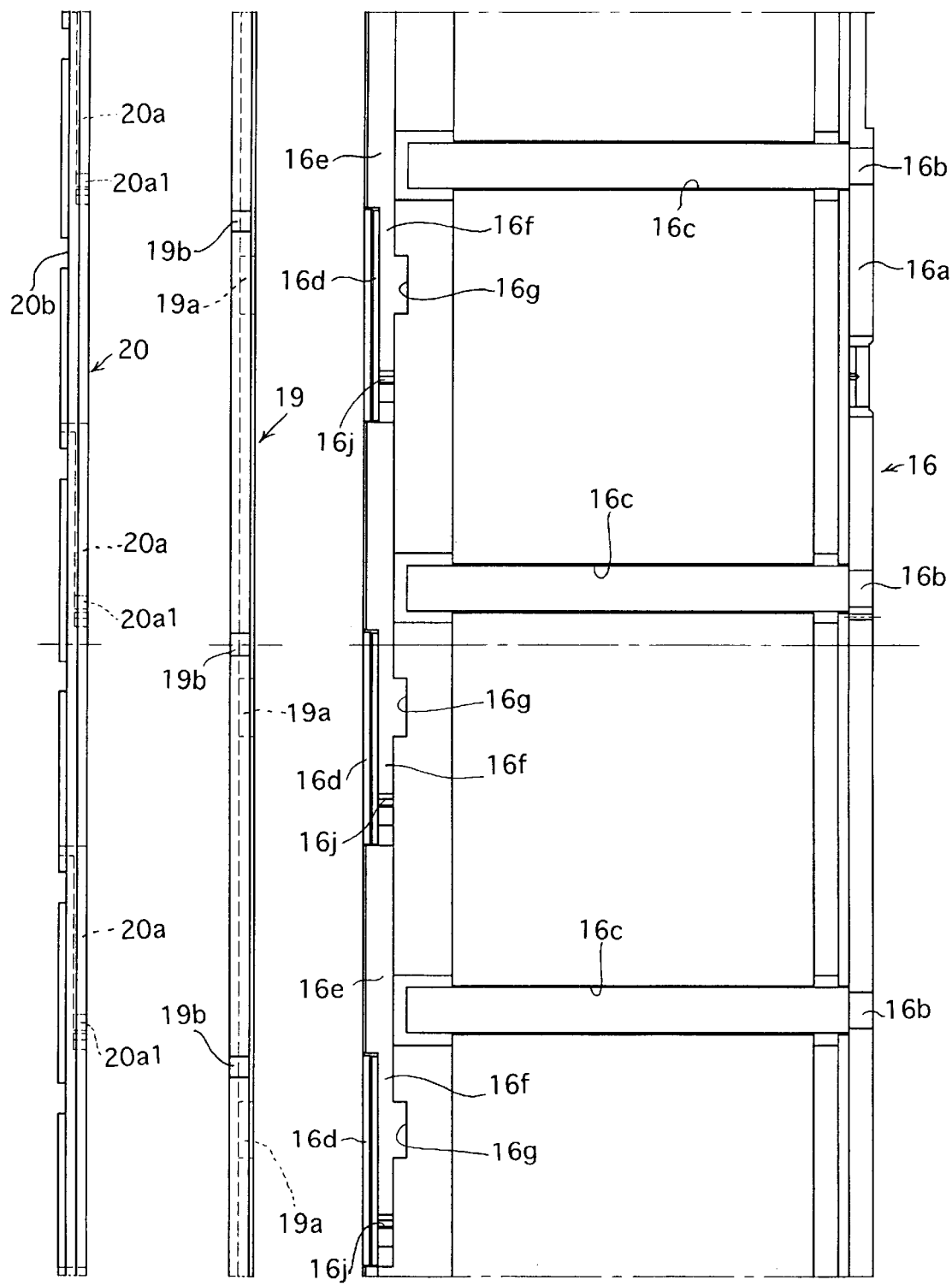
FIG. 7 is a developed view of the linear guide barrel, the linear guide ring and the retainer ring.

The coupling structure of the linear guide ring 19 and the retainer ring 20 to the front end of the linear guide barrel 16 will be hereinafter discussed with reference to FIGS. 6 and 7. The linear guide barrel 16 is provided, at the front end thereof at 120° intervals about the axis of the linear guide barrel 16, with three engaging lugs 16d each of which extends radially outwards. A receiving area 16e is formed between any two adjacent engaging lugs 16d of the linear guide barrel 16 in order to receive one of three radially inward projections 19a of the linear guide ring 19. The linear guide barrel 16 is provided immediately behind the three engaging lugs 16d with three grooves 16f, respectively. The radius of the linear guide barrel 16 from the axis of the linear guide barrel 16 to the bottom surface of each groove 16f is identical to the radius from the axis of the linear guide barrel 16 to the surface of each receiving area 16e. The linear guide barrel 16 is provided behind the three engaging lugs 16d with three recesses 16g, respectively, each of which is connected with the corresponding groove 16f. Each recess 16g is recessed rearward (toward the right as viewed in FIG. 7) in the direction parallel to the optical axis O, i.e., in the optical axis direction.

On the other hand, the linear guide ring 19 is provided with the aforementioned three inward projections 19a at 120° intervals about the axis of the linear guide ring 19. The three inward projections 19a can be inserted into the three receiving areas 16e, respectively. If the linear guide ring 19 is rotated about the axis thereof clockwise as viewed in FIG. 6 relative to the linear guide barrel 16 with the three inward projections 19a being properly inserted into the three receiving areas 16e, respectively, each inward projection 19a slides into the corresponding groove 16f. The linear guide ring 19 is provided with three radially outward projections 19b at 120° intervals about the axis of the linear guide ring 19. The circumferential positions of the three outward projections 19b are precisely determined with reference to the circumferential positions of the three inward projections 19a.

The retainer ring 20 is provided with radially inward blades 20a at 120° intervals about the axis of the retainer ring 20. The three inward blades 20a can be inserted into the three receiving areas 16e of the linear guide barrel 16, respectively. If the retainer ring 20 is rotated about the axis thereof clockwise as viewed in FIG. 6 relative to the linear guide barrel 16 with the three inward blades 20a being properly inserted into the three receiving areas 16e, respectively, each inward blade 20a slides into the corresponding groove 16f. The retainer ring 20 is provided on the front end face thereof with a plurality of grooves 20b which are recessed rearward, toward the linear guide barrel 16, so that a pin face wrench (not shown) can be engaged with the recessed portions 20b to rotate the retainer ring 20 relative to the linear guide barrel 16.

When the linear guide ring 19 is fixed to the front end of the linear guide barrel 16, firstly the three inward projections 19a are respectively inserted into the three receiving areas 16e, and then the linear guide ring 19 is rotated about the axis thereof clockwise as viewed in FIG. 6 relative to the linear guide barrel 16 so that each inward projection 19a slides into the corresponding groove 16f. Subsequently, each inward projection 19a is made to be fitted in the corresponding recess 16g. This engagement of each inward projection 19a with the corresponding recess 16g determines the fixed circumferential position of the linear guide ring 19 relative to the linear guide barrel 16. Subsequently, the inward blades 20a of the retainer ring 20 are respectively inserted into the three receiving areas 16e, and then the retainer ring 20 is rotated about the axis thereof clockwise as viewed in FIG. 6 relative to the linear guide barrel 16 so that each inward blade 20a slides into the corresponding groove 16f and presses the corresponding inward projection 19a into the corresponding recess 16g. This prevents the linear guide ring 19 from moving in the optical axis direction relative to the linear guide barrel 16. In this state, since each of the three inward blades 20a of the retainer ring 20 is held in one of the three grooves 16f between the corresponding engaging lug 16d and the corresponding inward projection 19a, the inward blades 20a and the engaging lugs 16d function to prevent the linear guide ring 19 from coming off the front end of the linear guide barrel 16. Between the linear guide barrel 16 and the retainer ring 20 is provided a click-stop device which prevents the retainer ring 20 from rotating counterclockwise as viewed in FIG. 6 so that the retainer ring 20 cannot come off the front end of the linear guide barrel 16 after the retainer ring 20 is properly engaged with the linear guide barrel 16. Three indentations 20a1 which are formed on the retainer ring 20 and corresponding three detent 16j which are formed on the linear guide barrel 16 to be respectively engaged with the three indentations 20a1 constitute the elements of the click-stop device (see FIGS. 6 and 7).

Accordingly, the outward projections 19b of the linear guide ring 19 that is fixed to the front end of the linear guide barrel 16 in the above described manner are located at predetermined specific positions (angular positions) relative to the linear guide projections 16b. The zoom lens is provided at the front thereof with an external barrel (a hood barrel) 25 (L). The external barrel 25 is provided, on an inner peripheral surface thereof at 120° intervals about the axis of the external barrel 25, with three linear guide grooves 25a which extend parallel to the optical axis O. The three outward projections 19b of the linear guide ring 19 are respectively engaged with the three linear guide grooves 25a to guide the external barrel 25 to move in the optical axis direction without rotating about the optical axis O. The external barrel 25 is provided at the rear end thereof with three radially inward pins 25b which are respectively engaged with three guide grooves 18b formed on outer peripheral surface of the second cam barrel 18 at 120° intervals about the axis thereof. The second cam barrel 18, the three guide grooves 18b and the three radially inward pins 25b constitute a feed mechanism.

Figure 8:
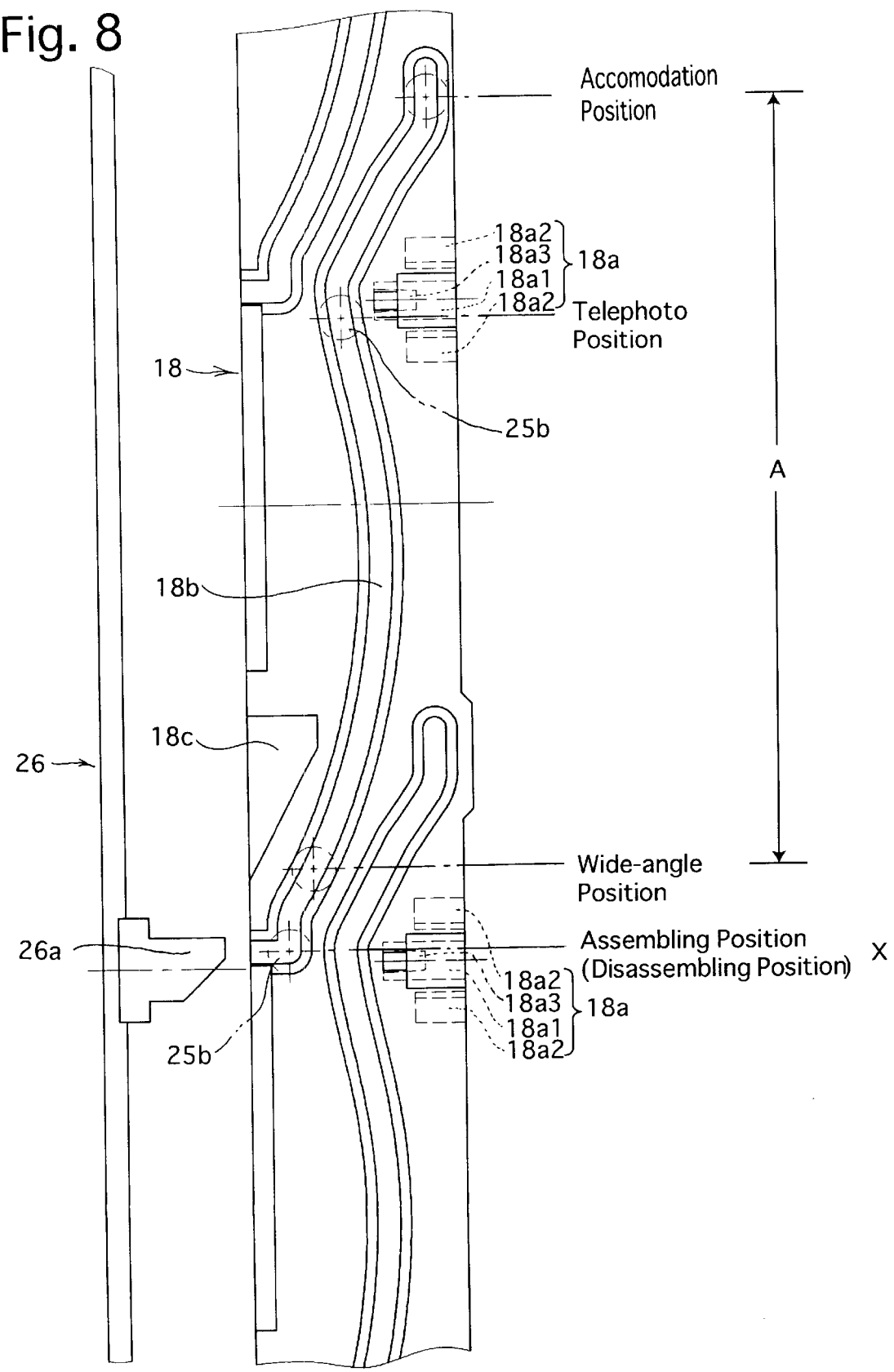
FIG. 8 is a developed view of a second cam barrel and a barrier drive ring, showing the positional relationship therebetween when the zoom lens is set at the telephoto extremity thereof (when the zoom lens is in a ready-to-photograph state)

As shown in FIG. 8, each of the three guide grooves 18b of the second cam barrel 18 defines an assembling position (or a disassembling position) X at which the three inward pins 25b of the external barrel 25 are respectively inserted into or taken out of the three guide grooves 18b of the second cam barrel 18. Each of the three guide grooves 18b further defines an accommodation position, a telephoto position and a wide-angle extremity, which determine the accommodation position, the telephoto extremity and the wide-angle extremity of the first cam barrel 17, respectively. The three guide grooves 18b are formed to move the external barrel 25 in the optical axis direction in accordance with the rotational position of the second cam barrel 18, which rotates together with the first cam barrel 17. More specifically, the three guide grooves 18b are formed to make the external barrel 25 function as a movable lens hood so that the external barrel 25 advances relative to the second cam barrel 18 (i.e., the first lens group L1) when the zoom lens is set at the telephoto extremity thereof having a narrow angle of view while the external barrel 25 retreats relative to the second cam barrel 18 when the zoom lens is set at the wide-angle extremity thereof having a wide angle of view. The external barrel 25 is positioned in the wide-angle extremity thereof and the telephoto extremity thereof in FIG. 10 and FIG. 11, respectively.

If the external barrel 25 is pressed rearward (i.e., toward the camera body) by an external force when the camera is in use, the compression springs 21 function as shock absorbers which can absorb at least part of such an external force since the compression springs 21 are positioned between the first cam barrel 17, which guides the first and second lens groups L1 and L2 in the optical axis direction, and the second cam barrel 18, which guides the external barrel 25 in the optical axis direction. Such an external force is transmitted partly to the first cam barrel 17 after having been absorbed to some extent by the compression springs 21, which prevents large external forces from being applied to the first cam barrel 17. Consequently, the precision of the axial position of each of the first and second lens groups L1 and L2 is influenced negligibly by external forces applied to the external barrel 25. In FIG. 2, the reference numeral 29 (F) designates a stationary external barrel which is integral with the camera body. The external barrel 25 advances and retreats with respect to the stationary external barrel 29.

Figure 13:
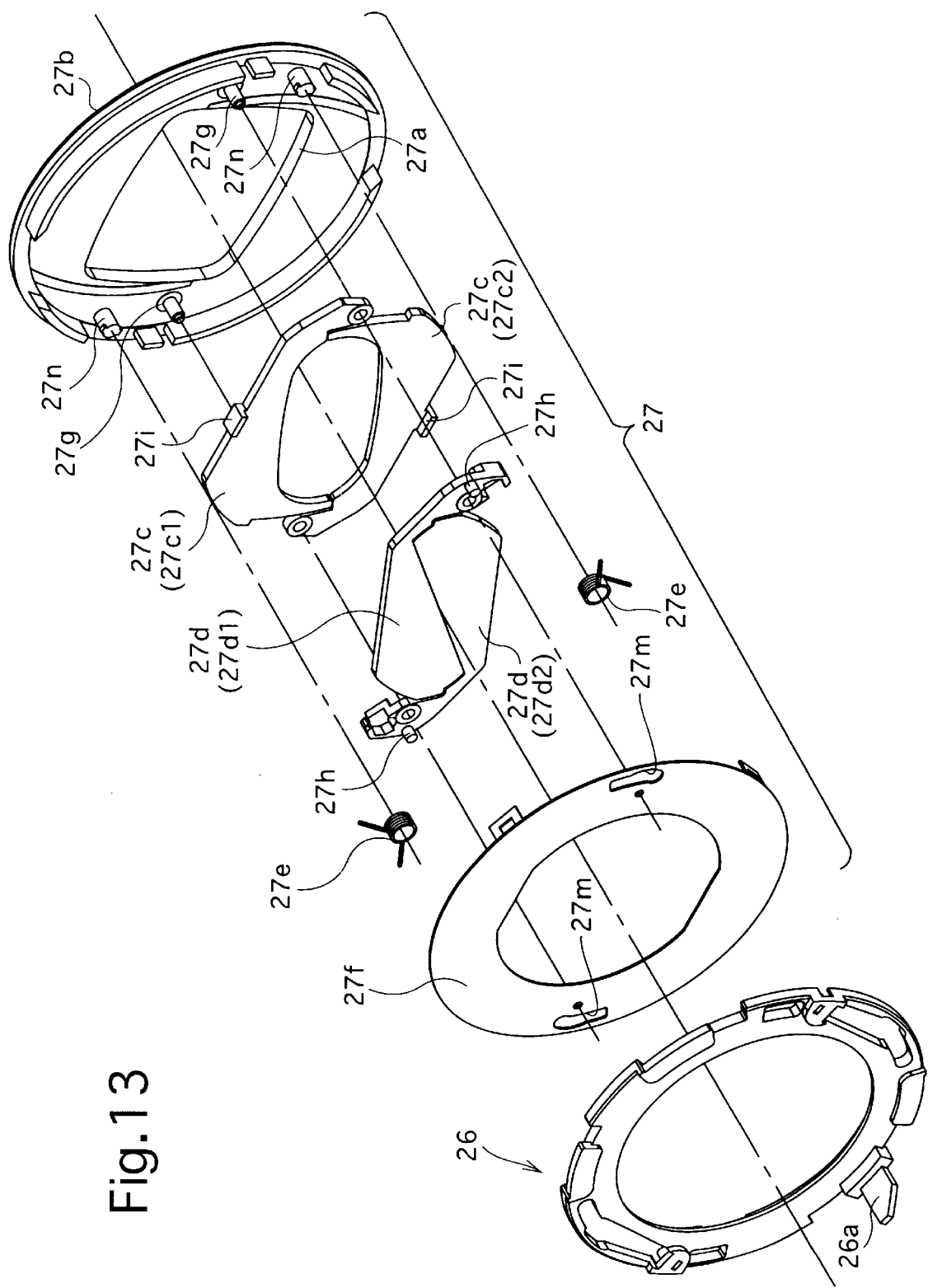
FIG. 13 is an exploded perspective view of the barrier block, viewed from behind the barrier block.
Figure 14:
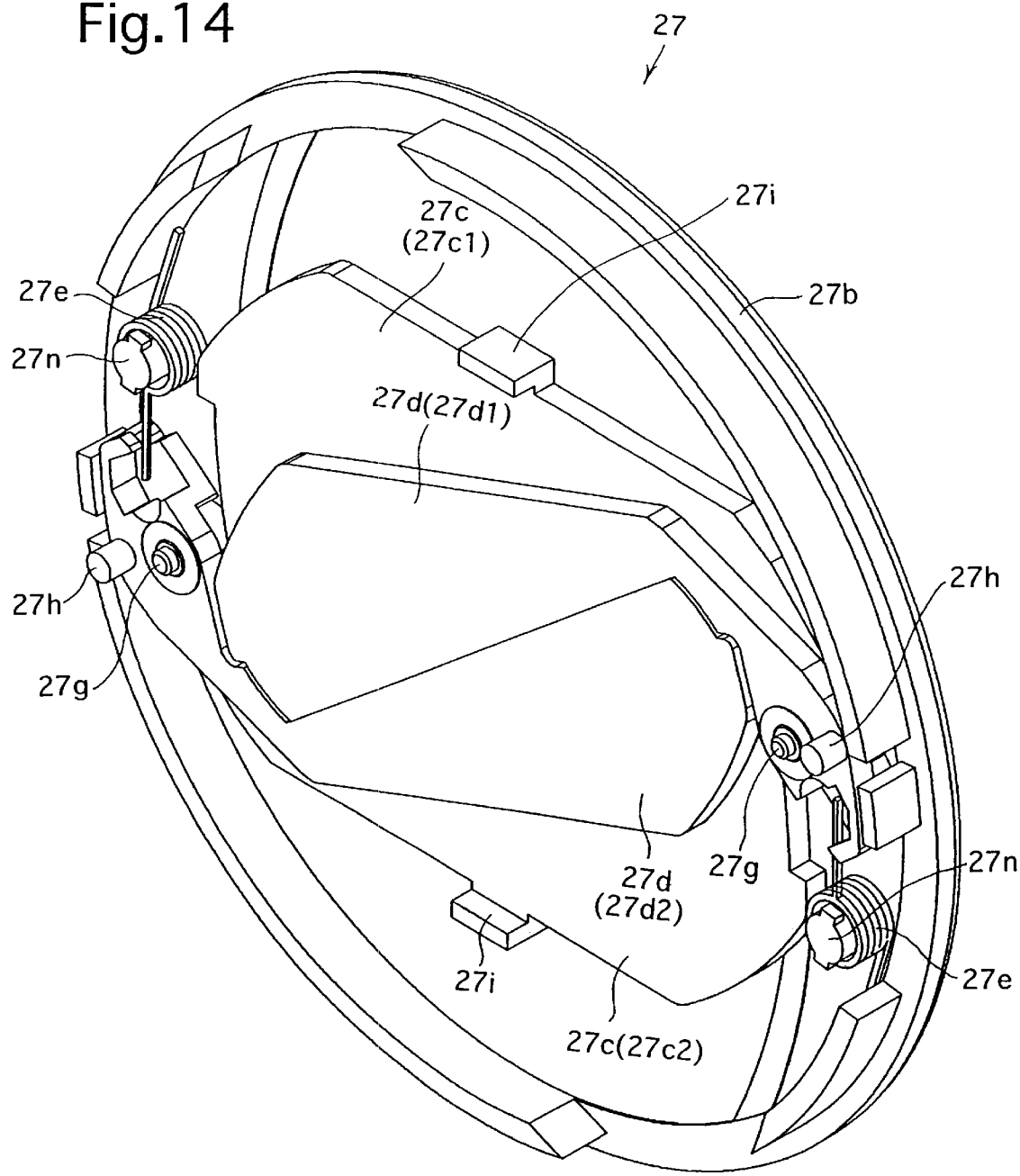
FIG. 14 is a perspective view of the barrier block with an annular pressure plate being removed from the barrier block, viewed from behind the barrier block.
Figure 15A:
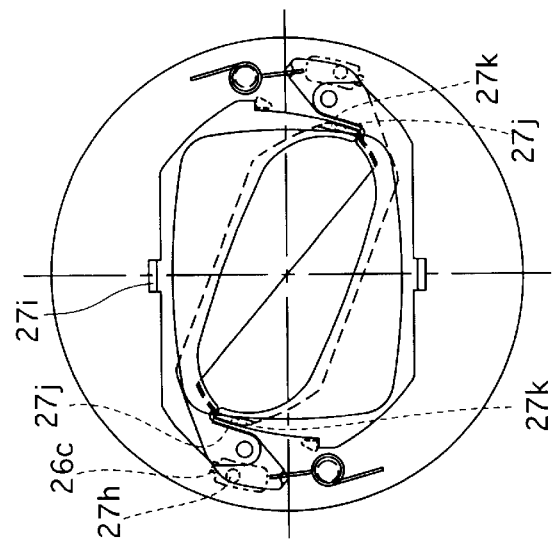
FIG. 15A is a schematic front view of the barrier block, showing two pairs of barrier blades in a fully open position.
Figure 15B:
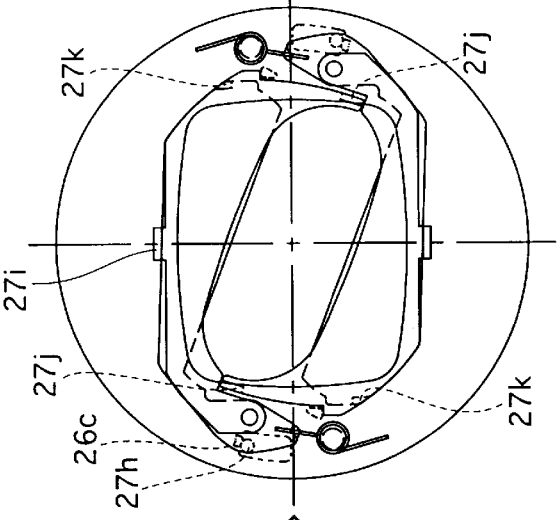
FIG. 15B is a schematic front view of the barrier block, showing the two pairs of barrier blades in a half-closed position.
Figure 15C:
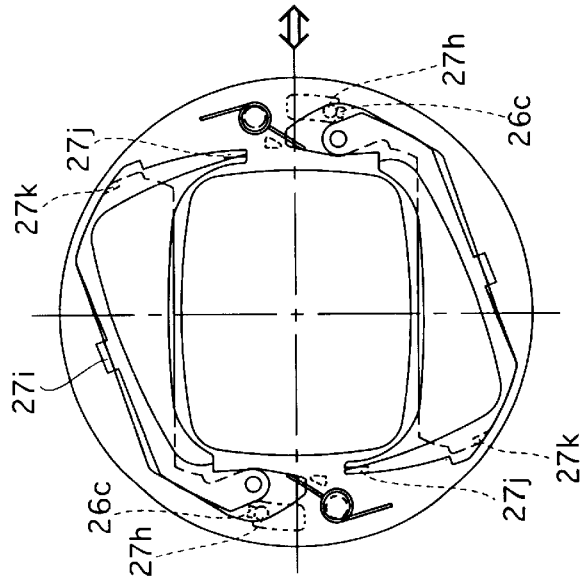
FIG. 15C is a schematic front view of the barrier block, showing the two pairs of barrier blades in a fully closed position.

The external barrel 25 is provided, at the front thereof in the radially inner side of the external barrel 25, with a barrier drive ring 26, so that the barrier drive ring 26 can rotate about the optical axis O. The barrier drive ring 26 functions to open and close two pairs of barrier blades 27c and 27d (i.e. the front pair of barrier blades 27c and the rear pair of barrier blades 27d) by rotating about the optical axis O. The two pairs of barrier blades 27c and 27d together function as a lens protection cover for protecting the front surface of the first lens group L1 from getting scratched, etc., when the digital camera is not in use. The barrier block 27 is provided with a panel 27b having a photographic aperture 27a, the aforementioned two pairs of barrier blades 27c and 27d supported by the panel 27b therebehind to open and close the photographic aperture 27a, and two torsion springs 27e which constantly bias the two pairs of barrier blades 27c and 27d in a direction to close the photographic aperture 27a. The barrier block 27 is further provided with an annular pressure plate 27f which holds the two pairs of barrier blades 27c and 27d and the torsion springs 27e between the panel 27b and the pressure plate 27f. The barrier block 27 having such elements is assembled in advance as a unit. The panel 27b is provided on a rear face thereof with two pivots 27g (see FIGS. 13 and 14) and two engaging pins 27n. The upper front barrier blade 27c1 of the front pair of barrier blades 27c and the upper rear barrier blade 27d1 of the rear pair of barrier blades 27d are pivoted at corresponding one of the two pivots 27g (the right pivot 27g as viewed in FIG. 13), while the lower front barrier blade 27c2 of the front pair of barrier blades 27c and the lower rear barrier blade 27d2 of the rear pair of barrier blades 27d are pivoted at the other pivot 27g (the left pivot 27g as viewed in FIG. 13). Each of the rear pair of barrier blades 27d is constantly biased to rotate in a direction to close the photographic aperture 27a of the panel 27b by the corresponding torsion spring 27e whose coil portion is fitted on the corresponding engaging pin 27n. Each of the rear pair of barrier blades 27d is provided in the vicinity of the pivoted portion thereof with a driven pin 27h that is driven to open the corresponding rear barrier blade 27d against the spring force of the corresponding torsion spring 27e. Each of the front pair of barrier blades 27c is provided on an outer edge thereof with an engaging projection 27i which extends rearward to be engaged with the outer edge of the corresponding rear barrier blade 27d so that-the engaging projection 27i of each of the front pair of barrier blades 27c comes into engagement with the outer edge of the corresponding rear barrier blade 27d to rotate the corresponding front barrier blade 27c in the direction to open the photographic aperture 27a together with the corresponding rear barrier blade 27d when the corresponding rear barrier blade 27d is driven to rotate in the direction to open the photographic aperture 27a. The upper front barrier blade 27c1 is provided on a rear surface thereof with an engaging projection 27j, while the upper rear barrier blade 27d1 is provided on a front surface thereof with an engaging projection 27k (see FIGS. 15A, 15B and 15C). When the upper rear barrier blade 27d1 is driven to rotate in the direction to close the photographic aperture 27a, the engaging projection 27k of the upper rear barrier blade 27d1 is engaged with the engaging projection 27j of the upper front barrier blade 27c1 to drive the upper front barrier blade 27c1 to rotate in the direction to close the photographic aperture 27a together with the upper rear barrier blade 27d1. Likewise, the lower front barrier blade 27c2 is provided on a rear surface thereof with an engaging projection 27j, while the lower rear barrier blade 27d2 is provided on a front surface thereof with an engaging projection 27k (see FIGS. 15A, 15B and 15C). When the lower rear barrier blade 27d2 is driven to rotate in the direction to close the photographic aperture 27a, the engaging projection 27k of the lower rear barrier blade 27d2 is engaged with the engaging projection 27j of the lower front barrier blade 27c2 to drive the lower front barrier blade 27c2 to rotate in the direction to close the photographic aperture 27a together with the lower rear barrier blade 27d2.

The pressure plate 27f is provided with two slots 27m through which the two drive pins 27h of the rear pair of barrier blades 27d penetrate toward the barrier drive ring 26, respectively.

Figure 16:
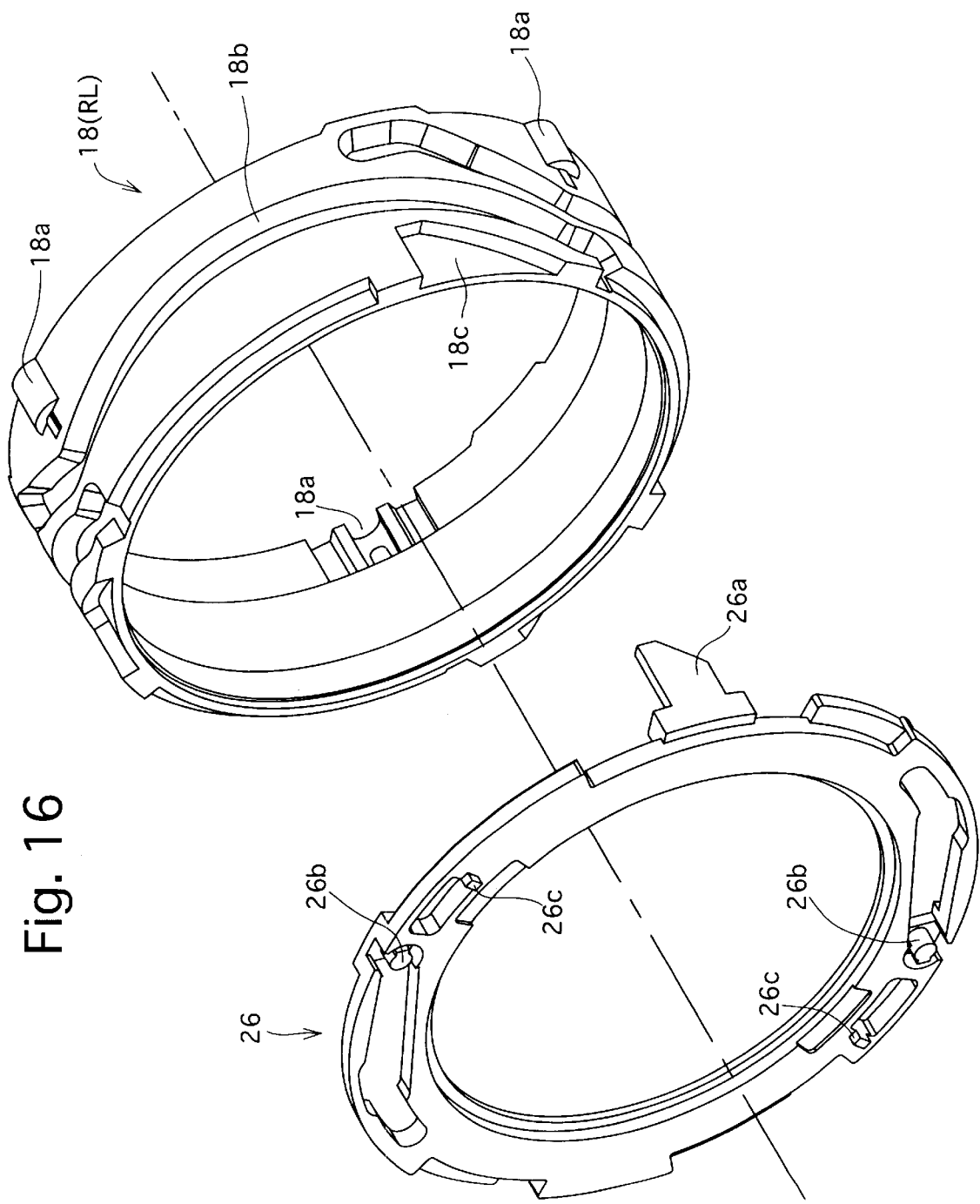
FIG. 16 is a perspective view of the second cam barrel and the barrier drive ring, showing the positional relationship between a driven lever which extends from the barrier drive ring and a rotation transfer recess formed on the second cam barrel.

The barrier drive ring 26 is provided on the front thereof with two protrusions 26b, while the external barrel 25 is provided in the vicinity of the front end thereof with corresponding two protrusions 25c (see FIGS. 16, 17 and 18). Two helical extension springs 28 are positioned between the external barrel 25 and the barrier drive ring 26 so that one and the other ends of one helical extension spring 28 are hooked on one of the two protrusions 26b and corresponding one of the two protrusions 25c, respectively, and one and the other ends of the other helical extension spring 28 are hooked on the other protrusion 26b and the other protrusion 25c, respectively. The spring force of each helical extension spring 28 is-stronger than the spring force of each torsion spring 27e. The barrier drive ring 26 is constantly biased by the two helical extension springs 28 to rotate in the direction to open the two pairs of barrier blades 27c and 27d. The barrier drive ring 26 is provided on the front thereof with two protrusions 26c which can be respectively engaged with the two drive pins 27h of the rear pair of barrier blades 27d to open the two pairs of barrier blades 27c and 27d. When the barrier drive ring 26 is rotated to the rotational limit thereof by the spring force of the helical extension springs 28, each of the two protrusions 26c is engaged with the corresponding driven pin 27h to push the same in the direction to open the corresponding rear barrier blade 27d against the spring force of the corresponding torsion spring 27e, so that the corresponding front barrier blade 27c also opens via the engaging projection 27i thereof (see FIGS. 15A, 15B and 15C).

Figure 9:
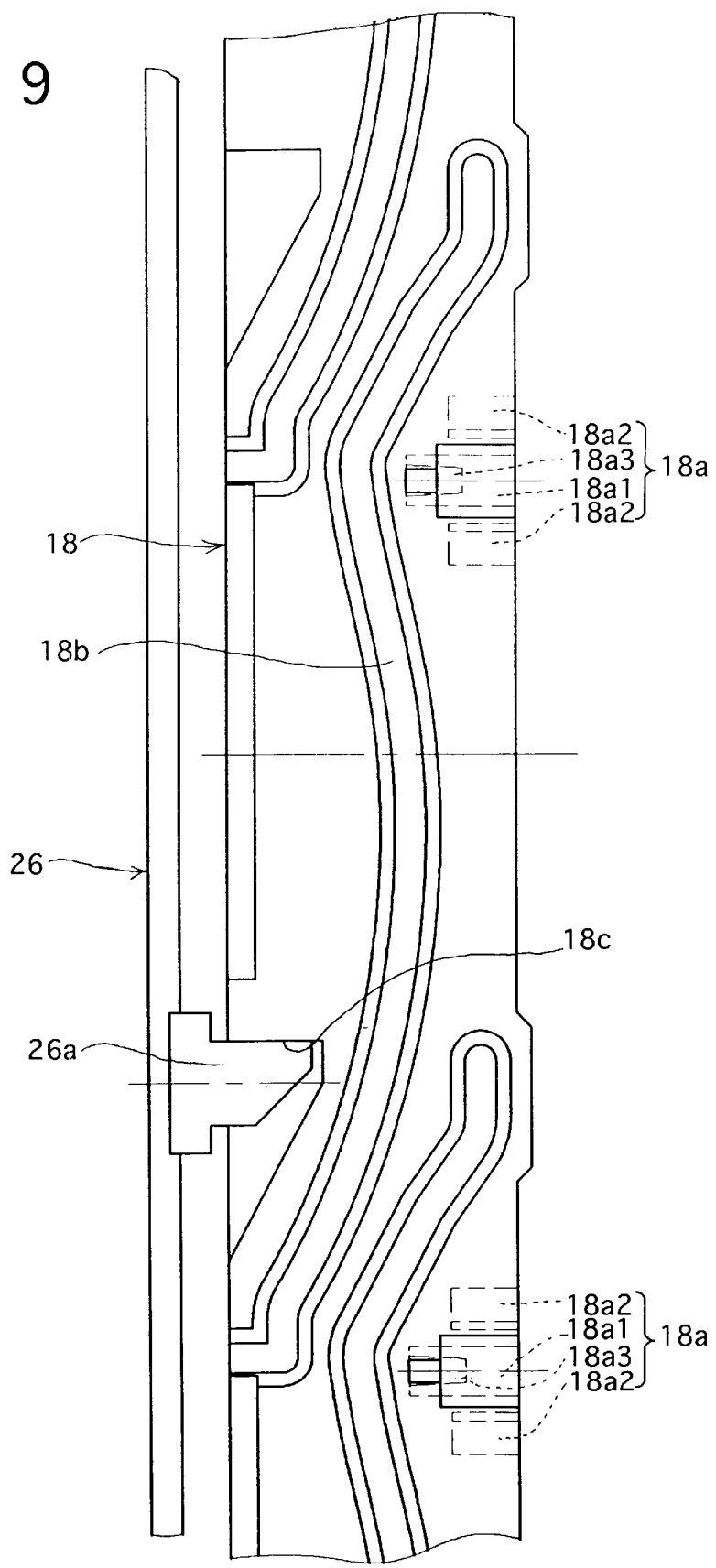
FIG. 9 is a developed view of the second cam barrel and the barrier drive ring, showing the positional relationship therebetween when the zoom lens is positioned in the accommodation position (when the power of the zoom lens is turned OFF)

On the other hand, the barrier drive ring 26 is provided with a driven lever 26a which extends from the rim of the barrier drive ring 26 toward the second cam barrel 18 to be engaged with, and disengaged from, a rotation transfer recess 18c formed on an outer peripheral surface of the second cam barrel 18 (see FIGS. 8, 9 and 16). Since the barrier drive ring 26 is supported by the external barrel 25 to be rotatable about the optical axis O relative to the external barrel 25, but immovable in the optical axis direction relative to the external barrel 25, the barrier drive ring 26 moves toward and away from the rotating second cam barrel 18 if the external barrel 25 linearly moves in the optical axis direction due to the engagement of the inward pins 25b of the external barrel 25 with the guide grooves 18b of the second cam barrel 18 as can be seen in FIGS. 8 and 9. The driven lever 26a and the rotation transfer recess 18c are apart from each other when positioned within a photographing range (i.e., between the telephoto extremity and the wide-angle extremity) as shown in FIG. 8. When the zoom barrel retreats from the telephoto extremity thereof to the accommodation position thereof, the driven lever 26a approaches the rotation transfer recess 18c and is then engaged with the rotation transfer recess 18c to apply a force to the barrier drive ring 26 to rotate the same in the direction to close the two pairs of barrier blades 27c and 27d. When the barrier drive ring 26 rotates to the rotational limit thereof against the spring force of the helical extension springs 28, each of the protrusions 26c of the barrier drive ring 26 disengages from the drive pins 27h of the corresponding rear barrier blade 27d. As a result, each of the rear pair of barrier blades 27d closes by the spring force of the corresponding torsion spring 27e, so that each of the front pair of barrier blades 27c also closes via the corresponding engaging projections 27j and 27k to thereby close the photographic aperture 27a (see FIG. 14). Conversely, when the zoom barrel advances from the accommodation position thereof to the telephoto extremity thereof, the driven lever 26a moves forwards and then disengages from the rotation transfer recess 18c to thereby allow the barrier drive ring 26 to rotate in the direction to open the two pairs of barrier blades 27c and 27d by the spring force of the helical extension springs 28. As a result, each of the protrusions 26c of the barrier drive ring 26 is engaged with the drive pin 27h of the corresponding rear barrier blade 27d to push the same in the direction to open the corresponding front barrier blade 27c via the corresponding engaging projection 27i to thereby open the two pairs of barrier blades 27c and 27d. Accordingly, as can be understood by the above description, the two pairs of barrier blades 27c and 27d are driven to open and close by rotation of the barrier drive ring 26. It should be noted that the barrier drive ring 26 has only one driven lever 26a, whereas the second cam barrel 18 has three rotation transfer recesses 18c formed at 120° intervals about the axis of the second cam barrel 18. One rotation transfer recess 18c which is actually used is freely selected from the three rotation transfer recesses 18c during assembly.

Figure 10:
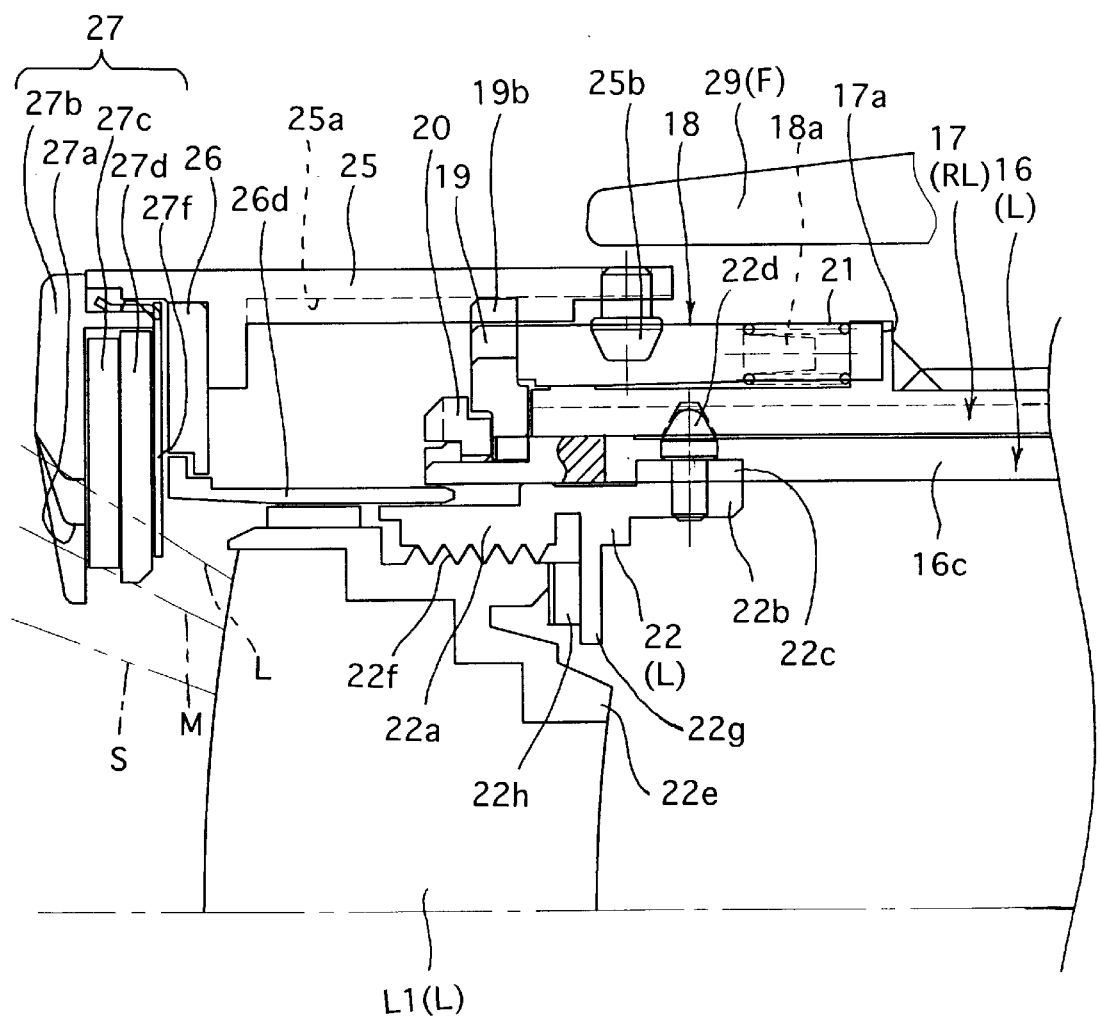
FIG. 10 is an axial cross sectional view of the zoom lens show in FIG. 1, showing the zoom lens above the optical axis thereof, showing the positional relationship between a moveable external barrel and the second cam barrel (a first lens group) when the zoom lens is set at the wide-angle extremity thereof.
Figure 11:
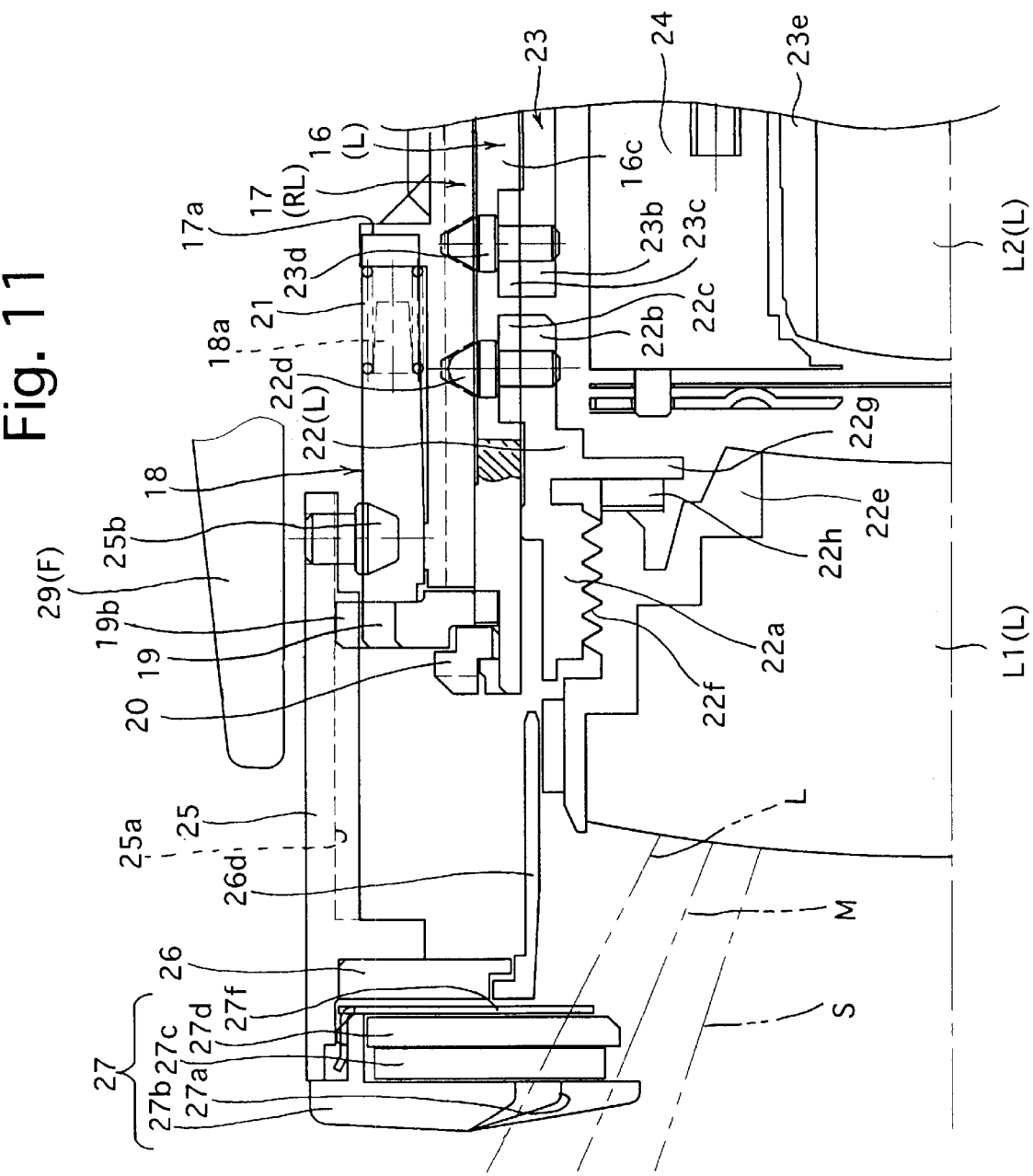
FIG. 11 is an axial cross sectional view of the zoom lens show in FIG. 1, showing the zoom lens above the optical axis thereof, and showing the positional relationship between the moveable external barrel and the second cam barrel (the first lens group) when the zoom lens is set at the telephoto extremity thereof.
Figure 12:
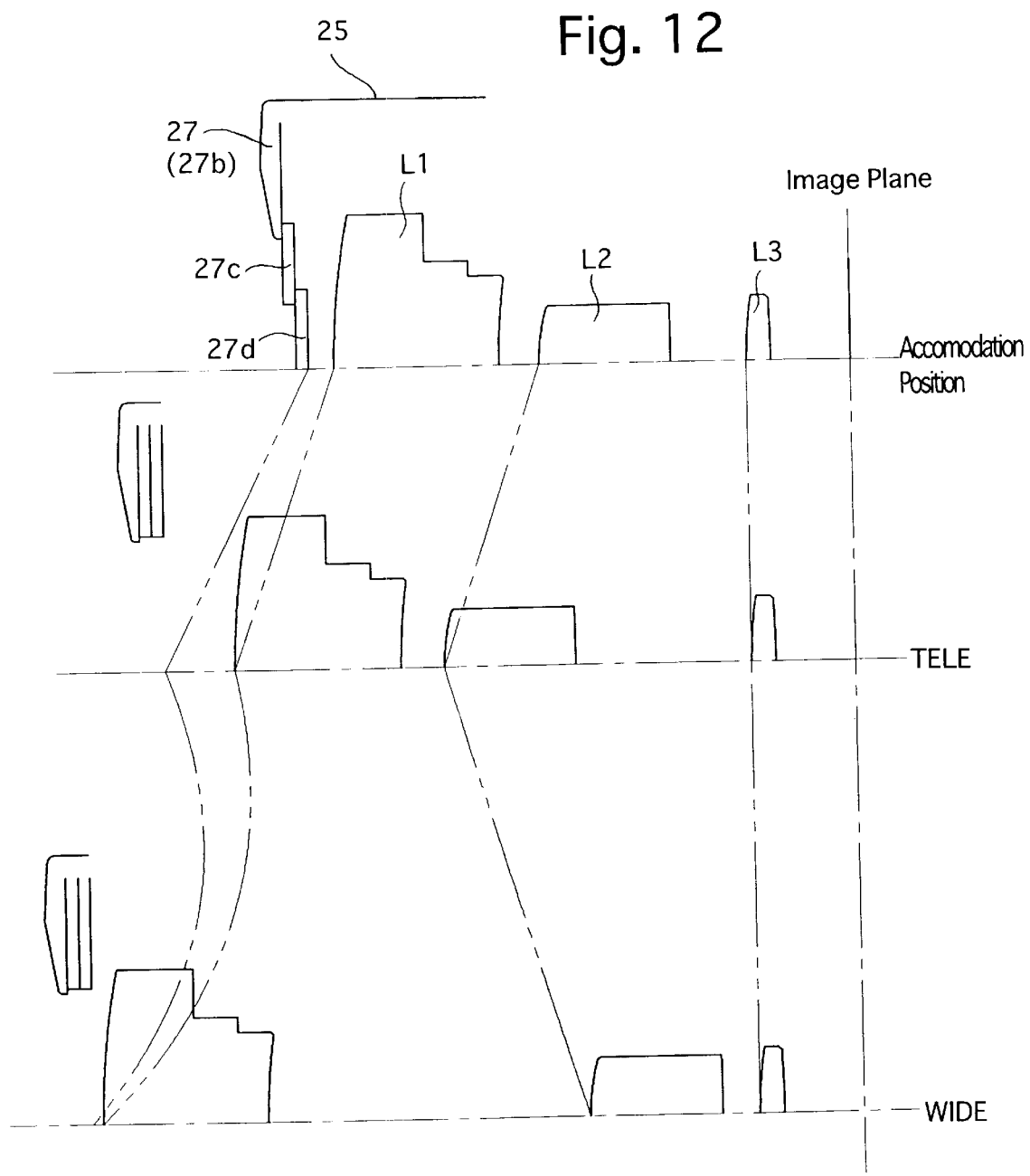
FIG. 12 is an explanatory view showing variations in axial position of the sensitive surface (image plane) of a CCD, the first lens group, a second lens group, and a barrier block when the zoom lens is driven from the accommodation position to the telephoto extremity and thereafter to the wide-angle extremity.

The external barrel 25 that is guided in the optical axis direction moves forward and rearward in the optical axis direction by rotation of the second cam barrel 18 in the above described manner. On the other hand, the first and second lens groups L1 and L2 move forward and rearward in the optical axis direction by rotation of the first cam barrel 17. FIG. 12 shows the axial position of the sensitive surface (image plane) of the CCD 12a on which subject images are formed through the photographic optical system, and the variations in the axial positions of the first lens group L1 (the principal point of the first lens group L1), the second lens group L2 (the principal point of the first lens group L2), and the barrier block 27 fixed to the front end of the external barrel 25 (more specifically, the photographic aperture 27a formed on the panel 27b of the barrier block 27), when the zoom lens is driven from the accommodation position to the wide-angle extremity via the telephoto extremity. The contours of the first and second cam grooves 17C1 and 17C2 of the first cam barrel 17 and the guide grooves 18b of the second cam barrel 18 are determined so that the first lens group L1, the second lens group L2 and the barrier block 27 move in the optical axis direction to have the moving paths shown in FIG. 12. The photographic aperture 27a has a generally rectangular shape as viewed from the front of the digital camera. The angle of view in the diagonal direction of the photographic aperture 27a is greater than the angle of view in the lateral (horizontal) direction of the photographic aperture 27a, while the angle of view in the lateral direction of the photographic aperture 27a is greater than the angle of view in the longitudinal (vertical) direction of the photographic aperture 27a. In FIG. 10, an incident light ray S on the zoom lens along the angle of view in the longitudinal direction of the photographic aperture 27a, an incident light ray M on the zoom lens along the angle of view in the lateral direction of the photographic aperture 27a, and an incident light ray L on the zoom lens along the angle of view in the diagonal direction of the photographic aperture 27a are shown by two-dot chain lines.

A light shield barrel 26d which extends from the inner edge of the barrier drive ring 26 to the front end of the outer peripheral surface of the first lens frame 22 is adhered to the inner edge of the barrier drive ring 26 by an adhesive. The light shield barrel 26d is rotationally symmetrical about the optical axis O, so that the shielding characteristics of the light shield barrel 26d do not vary even if the light shield barrel 26d rotates forwardly and reversely together with the barrier drive ring 26 about the optical axis O.

Almost all the above mentioned elements of the zoom lens except for each spring, the feed screw 10e, the set screws 23f, the follower pins 22d, the follower pins 23d, the shutter block 24, the radially inward pins 25b, the flexible coding plate 14 and the brush 15 are made of synthetic resin. Although each lens element of the first, second and third lens groups L1, L2 and L3 can be made of a plastic, at least the frontmost lens element is preferably a glass lens for the purpose of preventing the front surface of the first lens group L1 from being scratched.

In the above illustrated embodiment, although the third lens group L3 functions as focusing lens group, the zoom lens can be modified so that the first lens group L1 or the second lens group L2 functions as focusing lens group. In the case where the second lens group L2 functions as focusing lens group, the shutter block can be modified to have an auto-focusing function. Such a shutter block is well-known in the art.

As can be understood from FIG. 12, each of the first and second lens groups L1 and L2 is driven forward and rearward in the optical axis direction by rotation of the first cam barrel 17 to vary the focal length, while the moveable external barrel 25 together with the barrier block 27 is driven forward and rearward in the optical axis direction by rotation of the second cam barrel 18, which rotates together with the first cam barrel 17. The profiles of the first and second cam grooves 17C1 and 17C2 of the first cam barrel 17 and the guide grooves 18b of the second cam barrel 18 are determined so that the first lens group L1, the second lens group L2, and the barrier block 27 move in the optical axis direction to have the moving paths shown in FIG. 12.

FIG. 19 is a fragmentary developed view of the second cam barrel 18, showing one complete guide groove 18b of the three guide grooves 18b. Each of the three guide grooves 18b is provided with an assembling section AS which includes the aforementioned assembling position X (at which the three inward pins 25b of the moveable external barrel 25 are respectively inserted into, or taken out of, the three guide grooves 18b of the second cam barrel 18); and an operating section U which includes a zooming section Z. One end of the assembling section AS opens at the front end of the second cam barrel 18 and the other end is connected with one end of the operating section U or the zooming section Z. A minor part of the assembling section AS which includes the aforementioned assembling position X extends in the optical axis direction. The operating section U extends substantially along a circumference of the second cam barrel 18. The opposite ends of the zooming section Z correspond to the wide-angle position W and the telephoto position T, respectively. The wide-angle position W is closer to the assembling position X than the telephoto position T. Each of the three guide grooves 18b is further provided on the opposite end thereof with respect to the assembling position X with an accommodation position A. When the moveable external barrel 25 is coupled to the second cam barrel 18, firstly the second cam barrel 18 is rotated relative to the moveable external barrel 25 about the axis thereof, and then the three radially inward pins 25b of the moveable external barrel 25 are respectively aligned at the assembling positions X of the three guide grooves 18b of the second cam barrel 18. At this time, the three outward projections 19b of the linear guide ring 19 are respectively inserted into the three linear guide grooves 25a so as to guide the moveable external barrel 25 in the optical axis direction without rotating about the optical axis O. After the moveable external barrel 25 has been coupled to the second cam barrel 18 in such a manner, rotating the second cam barrel 18 in forward and reverse directions about the optical axis within the operating section u causes the moveable external barrel 25 to move forward and rearward in the optical axis direction in accordance with the contours of the guide grooves 18b. Therefore, in the zooming section Z, rotation of the first cam barrel 17 causes the focal length of the photographic optical system to vary while rotation of the second cam barrel 18, which rotates about the optical axis O together with the first cam barrel 17, causes the moveable external barrel 25 to move forward and rearward in the optical axis direction to change the space between the frontmost lens group (the first lens group L1) and the barrier block 27 in the optical axis direction to thereby prevent unwanted light from being incident on the frontmost lens surface of the zoom lens. In a state where each of the radially inward pins 25b of the moveable external barrel 25 is positioned in the operating section U of the corresponding guide groove 18b, the moveable external barrel 25 cannot be dismounted from the second cam barrel 18 by moving the moveable external barrel 25 forward relative to the second cam barrel 18. After the external barrel 25 has been mounted on the second cam barrel 18, the second cam barrel 18 is prevented from rotating to a rotational position, with a known device, where each radially inward pins 25b is positioned at the assembling position X of the associated guide grooves 18b of the second cam barrel 18.

The photographic aperture 27a, which is formed at the front end of the external barrel 25 on the panel 27b of the barrier block 27, has a generally rectangular shape as viewed from the front of the digital camera, and the rectangular shape of the photographic aperture 27a is similar to the front shape of the sensitive surface of the CCD 12a. The panel 27b having the photographic aperture 27a prevents unwanted light from being incident on the frontmost lens surface of the zoom lens in accordance with a variation of the focal length of the zoom lens.

Although the above illustrated embodiment of the zoom lens is provided at the front end of the external barrel 25 with the barrier block 27, the barrier block 27 does not have to be provided at the front end of the external barrel 25, a simple aperture (photographic aperture) need only to be provided at the front end of the external barrel 25. In this case, it is preferable for a protection glass to be provided to cover the photographic aperture. According to this modified embodiment of the zoom lens, the external barrel 25 can be formed longer.

In the above illustrated embodiment, although the first cam barrel 17 used for varying the focal length of the photographic optical system, and the second cam barrel 18 used for driving the moveable external barrel 25 forward and rearward in the optical axis direction are provided separately from each other, the first and second cam barrels 17 and 18 can be formed as a single cam barrel. In other words, three guide grooves corresponding to the three guide grooves 18b of the second cam barrel 18 can be formed on the first cam barrel 17. In the present invention, the device utilized for varying the focal length of the photographic optical system is not limited solely to the device illustrated in the above embodiment. An alternative device can be utilized as long as it operates to make the second cam barrel 18, which drives the moveable external barrel 25 forward and rearward in the optical axis direction, rotate about the optical axis in accordance with a variation of the focal length of the photographic optical system.

Although the above described lens hood mounting mechanism is applied to a zoom lens of a digital camera, the lens hood mounting mechanism can be applied to a zoom lens of a lens-shutter type of conventional camera using sensitive film such as 35 mm or APS compact zoom camera.

As can be understood from the foregoing, according to an aspect of the present invention, a zoom lens having a movable lens hood which can vary the maximum incident angle of light incident on the lens surface in accordance with a variation of the angle of view.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A movable lens hood mechanism of a zoom lens, comprising:
    a plurality of lens groups guided linearly in a direction of an optical axis to change a focal length of said zoom lens;
    a first cam barrel driven to rotate to move said plurality of lens groups in said optical axis direction;
    a movable hood barrel having a photographic aperture positioned in front of the frontmost lens group of said plurality of lens groups and guided linearly in said optical axis direction; and
    a feed mechanism which drives said movable hood barrel forward and rearward in said optical axis direction relative to the frontmost lens group by rotation of said first cam barrel so that a space between said photographic aperture of said movable lens hood and the frontmost lens group in said optical axis direction varies in accordance with a variation of a focal length of said zoom lens.

2. The movable lens hood mechanism according to claim 1, wherein said feed mechanism comprises a second cam barrel for driving said moveable hood barrel forward and rearward in said optical axis direction,
    wherein said first cam barrel and second cam barrel are provided separately from each other, and
    wherein said first cam barrel and second cam barrel rotate together about said optical axis.

3. The movable lens hood mechanism according to claim 1, further comprising a barrier block fixed to a front end of said movable hood barrel to open and close said photographic aperture of said zoom lens.

4. The movable lens hood mechanism according to claim 3, wherein said feed mechanism comprises a second cam barrel for driving said moveable hood barrel forward and rearward in said optical axis direction,
    wherein said first cam barrel and second cam barrel are provided separately from each other,
    wherein said first cam barrel and second cam barrel rotate together about said optical axis, and
    wherein said barrier block comprises at least one barrier blade driven to open and close said photographic aperture, said movable lens hood mechanism further comprising a barrier drive ring driven to rotate by rotation of said second cam barrel to open and close said at least one barrier blade.

5. The movable lens hood mechanism according to claim 1, wherein said zoom lens is incorporated in a digital camera.

6. The movable lens hood mechanism according to claim 1, wherein said feed mechanism comprises a second cam barrel which is fitted on said first cam barrel,
    wherein said movable hood barrel is driven forward and rearward in said optical axis direction by rotation of said first cam barrel via said second cam barrel of said feed mechanism.

7. The movable lens hood mechanism according to claim 6, wherein said feed mechanism further comprises:
    a plurality of inward pins, fixed to said moveable hood barrel, which project radially inwards; and
    a corresponding plurality of guide grooves formed on an outer peripheral surface of said second cam barrel, said plurality of inward pins being respectively engaged in said corresponding plurality of guide grooves so that said moveable hood barrel moves in said optical axis direction by rotation of said second cam barrel.

8. The movable lens hood mechanism according to claim 1, further comprising a rotation transfer recess formed on an outer peripheral surface of said second cam barrel, and a driven lever provided on said movable hood barrel;
    wherein when a relative distance in the optical axis direction between the second cam barrel and the movable hood barrel becomes less than a predetermined distance, said driven lever associates with said rotation transfer recess so that the rotation of the second cam barrel is transmitted to said driven lever.

9. A movable lens hood mechanism of a zoom lens, comprising:
    a movable lens hood guided along an optical axis; and
    a feed mechanism which drives said movable lens hood forward and rearward along said optical axis to vary a maximum incident angle of light to a front surface of a frontmost lens group of said zoom lens in accordance with a variation of the angle of view of said zoom lens.

10. The movable lens hood mechanism according to claim 9, further comprising a barrier block fixed to the front end of said movable lens hood and having at least one barrier blade for opening and closing a photographic aperture of said zoom lens.

11. A zoom lens comprising:

a plurality of lens groups which are moved with respect to each other to change a focal length of said zoom lens;

a focusing lens group positioned behind said plurality of lens groups and driven in a direction of said optical axis to bring an object to be photographed into focus;

a first cam barrel having at least one cam groove on an inner peripheral surface of said first cam barrel, at least one of said plurality of lens groups being moved in said optical axis direction by rotation of said first cam barrel in accordance with a profile of said at least one cam groove;

a second cam barrel which is fitted on a front part of an outer peripheral surface of said first cam barrel to be rotatable about said optical axis together with said first cam barrel;

a movable hood barrel positioned around said second cam barrel and guided in said optical axis direction;

at least one inward pin fixed to said movable hood barrel to project radially inwards; and at least one guide groove formed on an outer peripheral surface of said second cam barrel, said at least one inward pin being respectively engaged in said at least one guide groove so that said movable hood barrel is driven forward and rearward in said optical axis direction relative to a frontmost lens group of said plurality of lens groups by rotation of said second cam barrel.

* * * * *